US012142248B1

(12) United States Patent
Spangler et al.

(10) Patent No.: US 12,142,248 B1
(45) Date of Patent: Nov. 12, 2024

(54) FOLDABLE STRINGED INSTRUMENT AND RELATED METHODS

(71) Applicant: Ciari Guitars, Inc., San Diego, CA (US)

(72) Inventors: Jonathan Spangler, San Diego, CA (US); Bryan Cornwall, Poway, CA (US); David Weckerly, Knox, PA (US); Joseph Glaser, Nashville, TN (US)

(73) Assignee: Ciari Guitars, Inc., San Diego, CA (US)

( * ) Notice: Subject to any disclaimer, the term of this patent is extended or adjusted under 35 U.S.C. 154(b) by 0 days.

(21) Appl. No.: 18/203,616

(22) Filed: May 30, 2023

Related U.S. Application Data

(63) Continuation of application No. 17/243,559, filed on Apr. 28, 2021, now Pat. No. 11,663,996.

(60) Provisional application No. 63/016,788, filed on Apr. 28, 2020.

(51) Int. Cl.

| | |
|---|---|
| ***G10D 3/12*** | (2020.01) |
| ***G10D 1/08*** | (2006.01) |
| ***G10D 3/095*** | (2020.01) |

(52) U.S. Cl.
CPC ............... *G10D 3/12* (2013.01); *G10D 1/085* (2013.01); *G10D 3/095* (2020.02)

(58) Field of Classification Search
CPC ........... G10D 3/12; G10D 1/085; G10D 3/095
See application file for complete search history.

(56) References Cited

U.S. PATENT DOCUMENTS 6,353,164 B1 * 3/2002 Corsi ........................ G10D 1/08 84/293

* cited by examiner

*Primary Examiner* — Kimberly R Lockett
(74) *Attorney, Agent, or Firm* — Jonathan Spangler, Esq.; Jay Bell, Esq.

(57) ABSTRACT

An actuator system for a foldable stringed instrument (for example, a travel guitar). The actuator system serves two primary function: 1) to selectively retract and extend a ram rod used to unlock and lock a mid-neck hinge of the foldable stringed instrument.

19 Claims, 41 Drawing Sheets

FIG. 37B
FIG. 37C
FIG. 37D
FIG. 37E
FIG. 37F
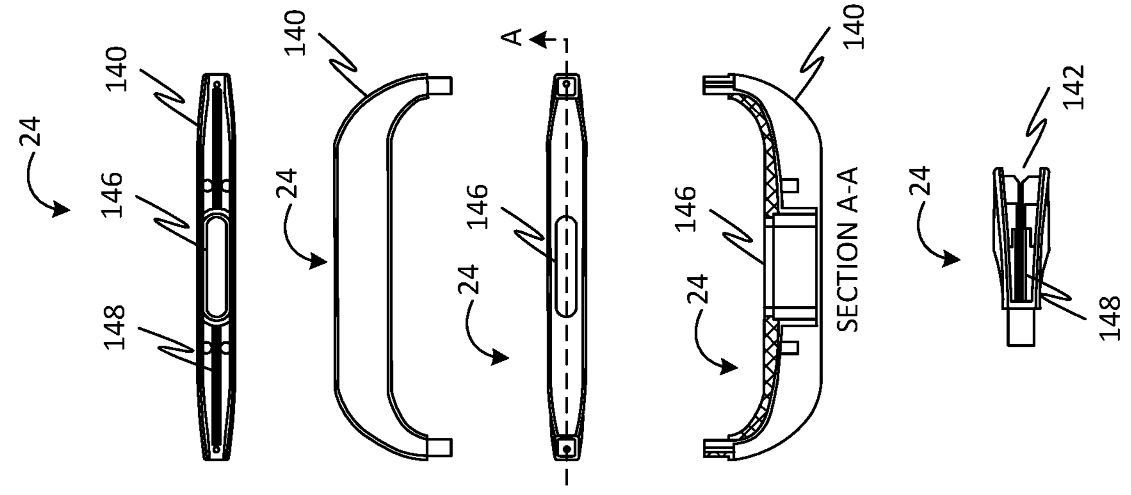
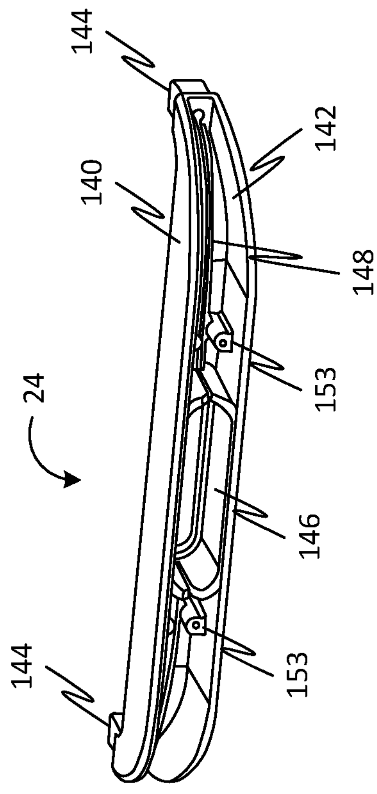
FIG. 37A

FOLDABLE STRINGED INSTRUMENT AND RELATED METHODS

CROSS REFERENCES TO RELATED APPLICATIONS

The present application is a continuation of U.S. patent application Ser. No. 17/243,559 filed Apr. 28, 2021, which claims the benefit of priority under 35 U.S.C. § 119(e) from U.S. Patent Application No. 63/016,788 filed Apr. 30, 2020, the entire contents of which are hereby expressly incorporated by reference into this disclosure as if set forth fully herein.

BACKGROUND OF THE INVENTION

I. Field of the Invention

The present invention relates generally to musical instruments and, more particularly, to a foldable fretted stringed instrument (such as a guitar) including an actuator to facilitate string management and folding/unfolding.

II. Discussion of the Prior Art

Stringed instruments, such as guitars, have enjoyed among the highest popularity among musical instruments. Most stringed instruments have a solid neck rigidly coupled to either a hollow or solid body. This construction, while aiding in predictable tuning and quality of play, render many stringed instruments cumbersome for travel (e.g. air, train, auto, etc. . . . ), particularly given the additional bulk of the associated case (hard or soft). While various stringed instruments have been attempted to make it easier and/or more convenient to travel with or store these stringed instruments, most are simply smaller or scaled down versions of their traditional counterparts, which still present challenges for travel and/or predictable tuning and quality of play. The present invention is directed at improving upon the current options available for foldable stringed instruments.

SUMMARY OF THE INVENTION

The present invention accomplishes this goal by providing a foldable stringed instrument including an actuator system to facilitate string management and folding/unfolding. The foldable stringed instrument folds mid-neck to assume a reduced profile. While referred to hereinafter within the context of an electric travel guitar, it will be appreciated that the scope of the invention extends beyond guitars and may include, by way of example only, any of a variety of stringed instrument that would benefit from a reduced profile for ease of travel and/or storage (e.g. acoustic guitar, bass guitar, ukulele, etc. . . . ).

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein:

FIGS. 37A-37F are various views of a handle grip forming part of the actuator assembly of FIGS. 1-7 according to aspects of the present invention;

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. The actuator system disclosed herein boasts a variety of inventive features and components that warrant patent protection, both individually and in combination.

Figure 46:
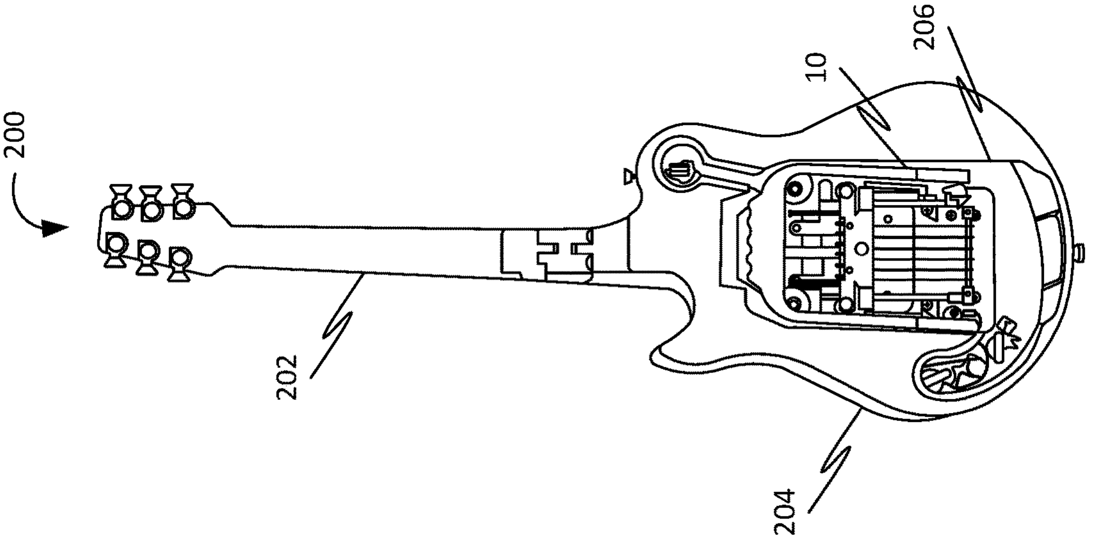
FIGS. 45-46 are front and back views, respectively, of a foldable stringed instrument in the form of (by way of example only) an electric guitar with the actuator assembly of FIGS. 1-7 mounted in a recess in the back of the guitar body according to aspects of the present invention.
Figure 45:
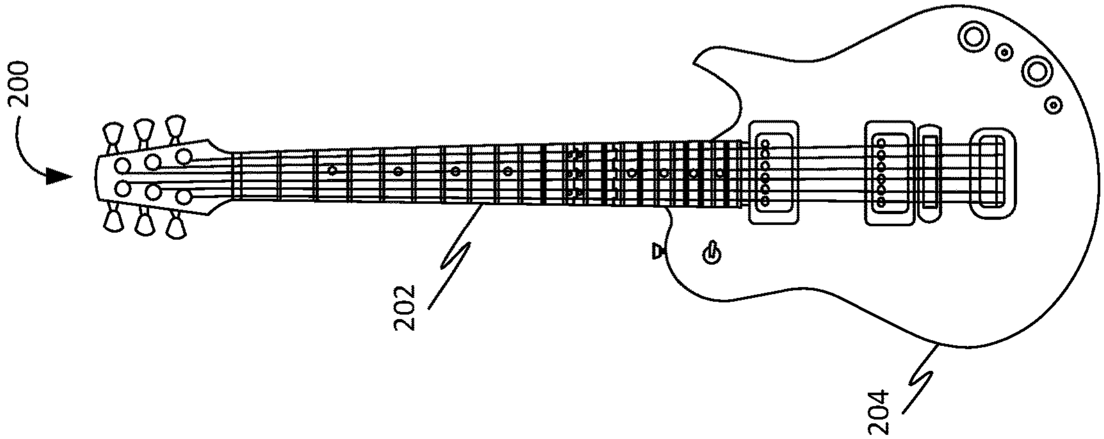
Figure 47:
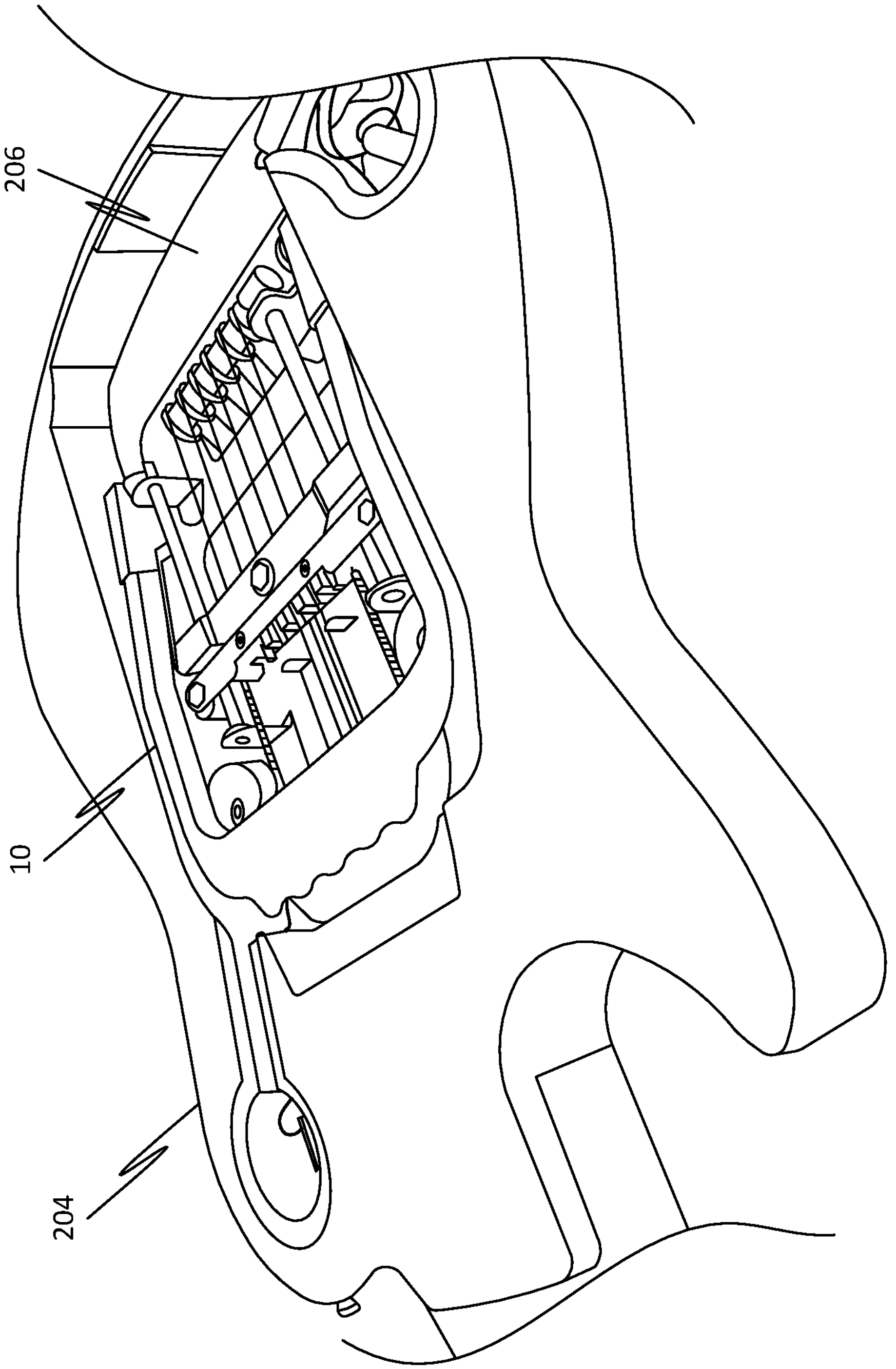
FIG. 47 is an enlarged perspective view of the body of the foldable stringed instrument of FIGS. 45-46 with the neck in the fully extended state and the actuator engaged as shown and described in FIG. 17 according to aspects of the present invention.
Figure 48:
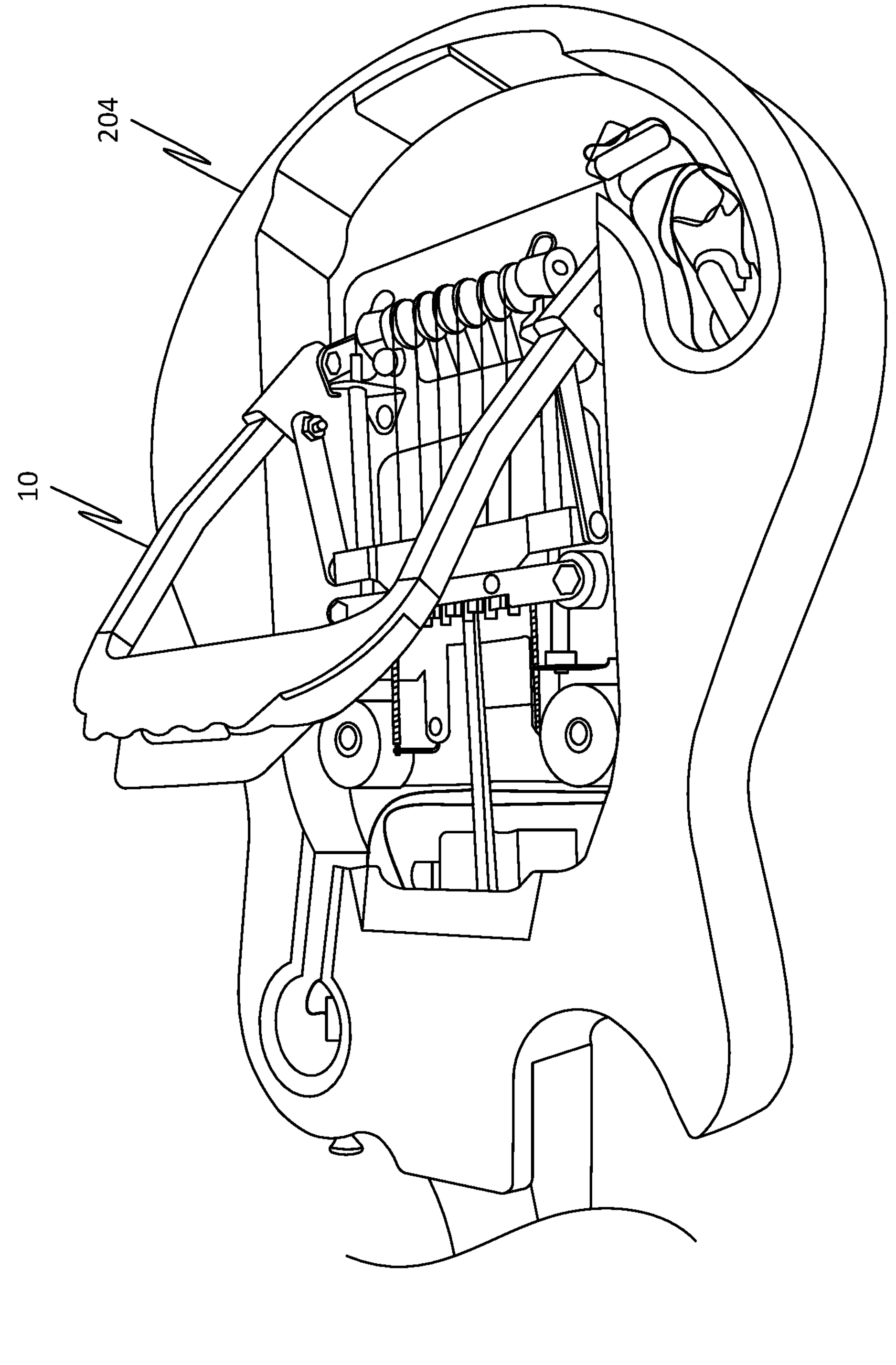
FIG. 48 is an enlarged perspective view of the body of the foldable stringed instrument of FIGS. 45-46 with the neck in the fully extended state and the actuator dis-engaged as shown and described in FIG. 18 according to aspects of the preset invention.
Figure 49:
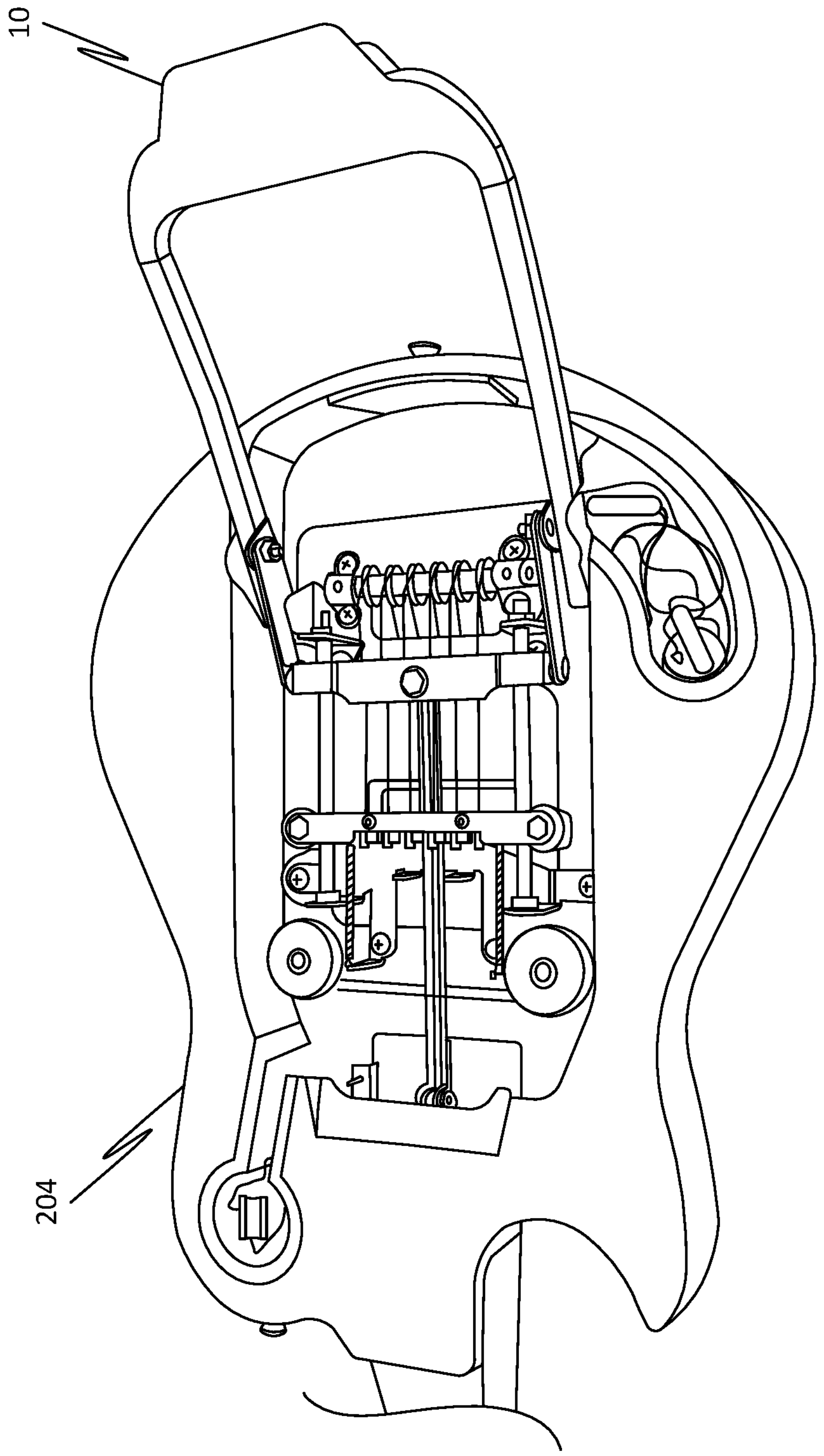
FIG. 49 is an enlarged perspective view of the body of the foldable stringed instrument of FIGS. 45-46 with the neck in the fully extended state and the actuator dis-engaged as shown and described in FIG. 19 according to aspects of the preset invention.
Figure 50:
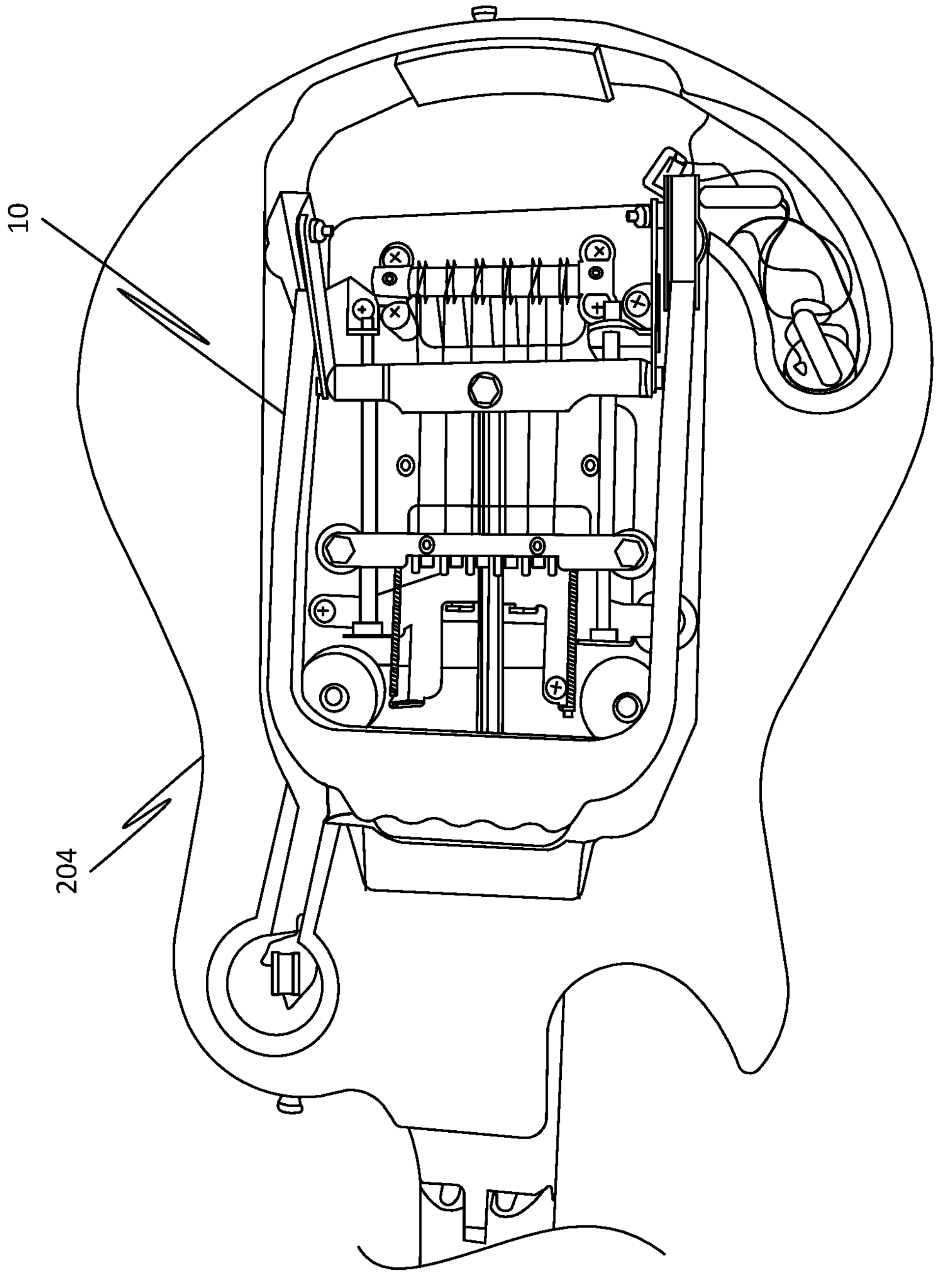
FIG. 50 is an enlarged view of the body of the foldable stringed instrument of FIGS. 45-46 with the neck in the fully extended state and the actuator dis-engaged as shown and described in FIG. 21 according to aspects of the preset invention.
Figure 51:
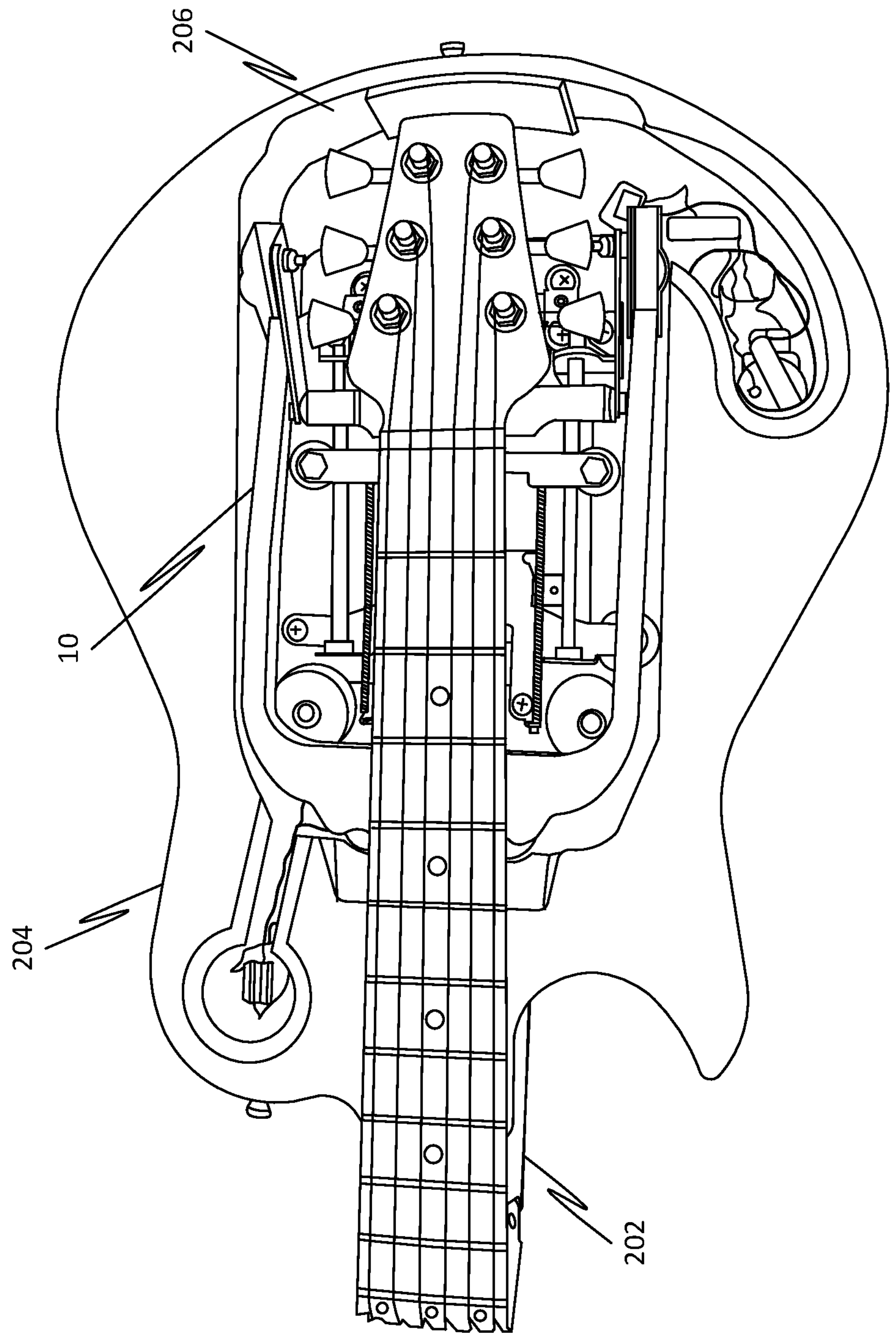
FIG. 51 is an enlarged view of the body of the foldable stringed instrument of FIGS. 45-46 with the neck in the folded state and the actuator dis-engaged as shown and described in FIG. 21 according to aspects of the preset invention.

FIGS. 1-7 illustrate various features and components of an actuator assembly 10 forming part of a folding mechanism for a foldable fretted instrument according to aspects of the present invention. The actuator assembly 10 includes a handle assembly 12 rotatably coupled to a pair of handle guides 14, 16, which are in turn rotatably coupled to a chassis comprising a pair of lower mounting plates 18, 20 attached to a base plate 22. The actuator assembly 10 may be mounted in any number of foldable stringed instruments, including (by way of example only) an electric guitar 200 shown in FIGS. 45-46. The electric guitar 200 includes a neck 202 mounted to a body 204. The body 204 includes a back recess 206. The base plate 22 is disposed within the recess 206 of body 204. Under the direction of the handle assembly 12, the actuator assembly 10 serves two primary functions to fold and unfold the stringed instrument: 1) it loosens and tightens the strings of the stringed instrument to enable folding and playing, respectively; and 2) it unlocks and locks a hinge forming part of the neck of the stringed instrument to enable folding and playing, respectively.

The handle assembly 12 includes a rounded grip 24, a pair of arm members 26, 28 rotatably coupled to the handle guides 14, 16, and a button 30 extending from the grip 24. As best viewed in FIG. 2, binding posts 15 are used to rotatably couple the arm members 26, 28 within the handle guides 14, 16 and also rotatably couple the handle guides 14, 16 to the lower mounting plates 18, 20. The button 30 is spring biased to extend through an aperture in the grip 24 of the handle assembly 12. The button 30 cooperates with a locking mechanism disposed within the handle assembly 12 for the purpose of selectively locking and unlocking the arm members 26, 28 to and from the handle guides 14, 16. The locking mechanism includes a cable assembly 32, a pair of wedges 27, and a spring clip 33 having a locking pin 34. The cable assembly 32 passes through the button 30 and onward for connection to a pair of wedges 27 disposed near the lower ends of the arm members 26, 28. The wedges 27, 29 are dimensioned to cooperate with a spring clip 33 disposed within each arm member 26, 28. The spring clip 33 includes a locking pin 34 which is dimensioned to extend through an aperture formed along the outer wall of each arm member 26, 28, as well as an aperture formed in the outer wall of the handle guides 14, 16.

When the button 30 is not depressed, the wedges 27 will not be acting upon the spring clip 33 and thus the locking pins 34 will extending through aperture in the outer walls of the arm members 26, 28. When the arm members 26, 28 are rotated into engagement with the handle guides 14, 16, the locking pins 34 will also extend through the apertures in the outer wall of the handle guides 14, 16 (due to the spring force of the spring clip 33) to effectively lock the arm members 26, 28 to the handle guides 14, 16. When the button 30 is depressed to overcome the internally biasing spring within the grip 24, the cable assembly 32 will be forced into motion such that the cable assembly 32 pulls the wedges 27 into engagement with the spring clips 33, which will retract the locking pins 34 into the interior of the arm members 26, 28 such that the arm members 26, 28 may be disengaged/unlocked from the handle guides 14, 16. In this state, the handle assembly 12 may be rotated and stored within a recess formed in the back of the body of the stringed instrument, after which the neck of the stringed instrument may be folded. The handle guides 14, 16 each include a beveled section 36 that bows outwardly in a lateral direction from an outer side wall 42. The beveled section 36 serves as an entry point for the locking pins 34 when the arm members 26, 28 are reengaging with the handle guides 14, 16. The beveled section 36 temporarily deflects the locking pins 34 into the interior of the arm members 26, 28 before extending through the apertures in the handle guides 14, 16 to lock the arm members 14, 16 to the handle guides 14, 16.

Figure 4:
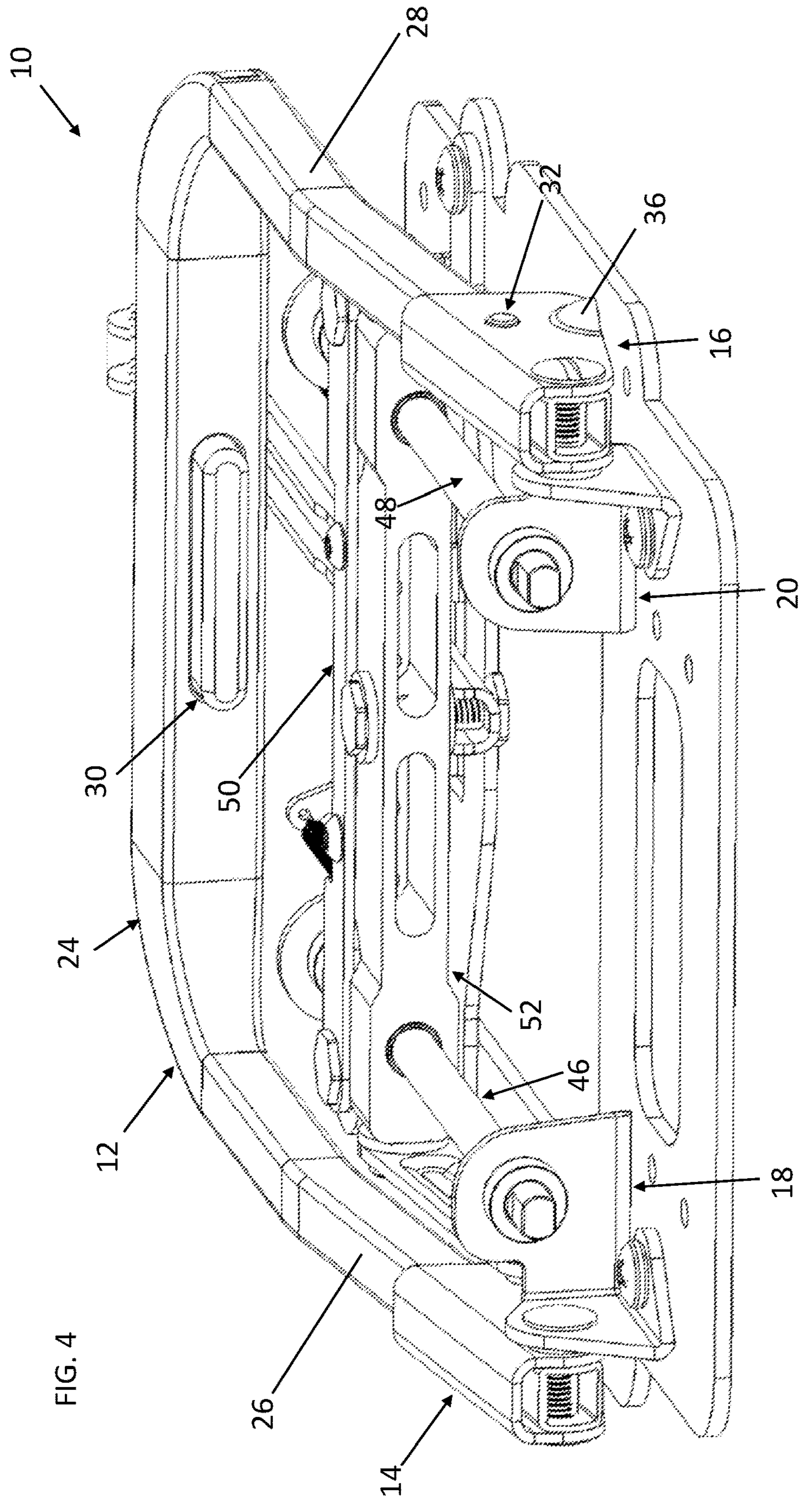
Figure 5:
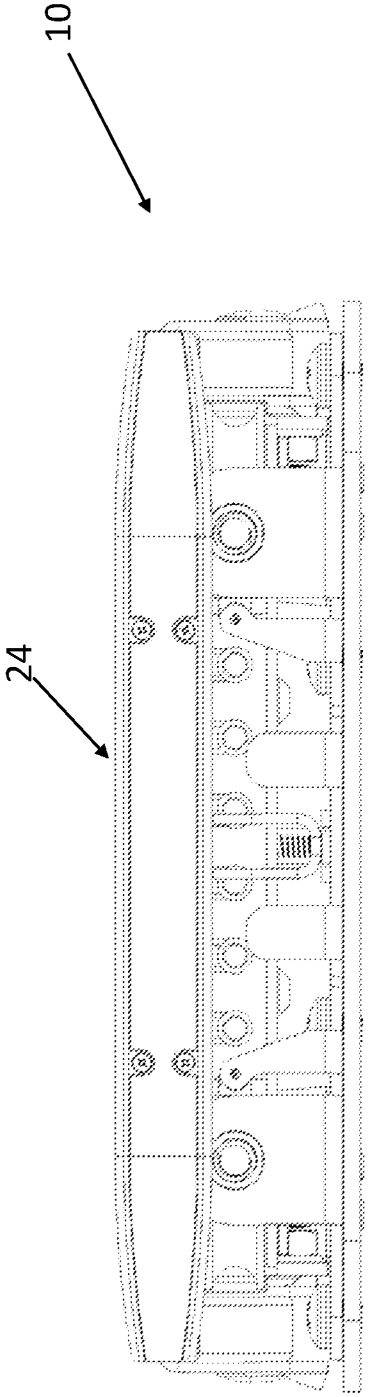
FIGS. 5-6 are end views (upper and lower) of the actuator assembly according to aspects of the present invention.
Figure 6:
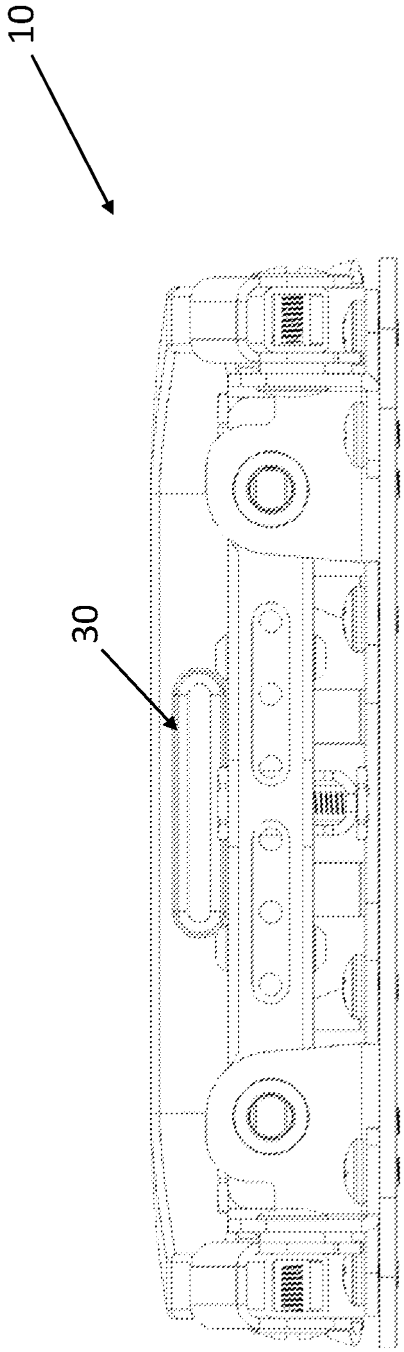
Figure 7:
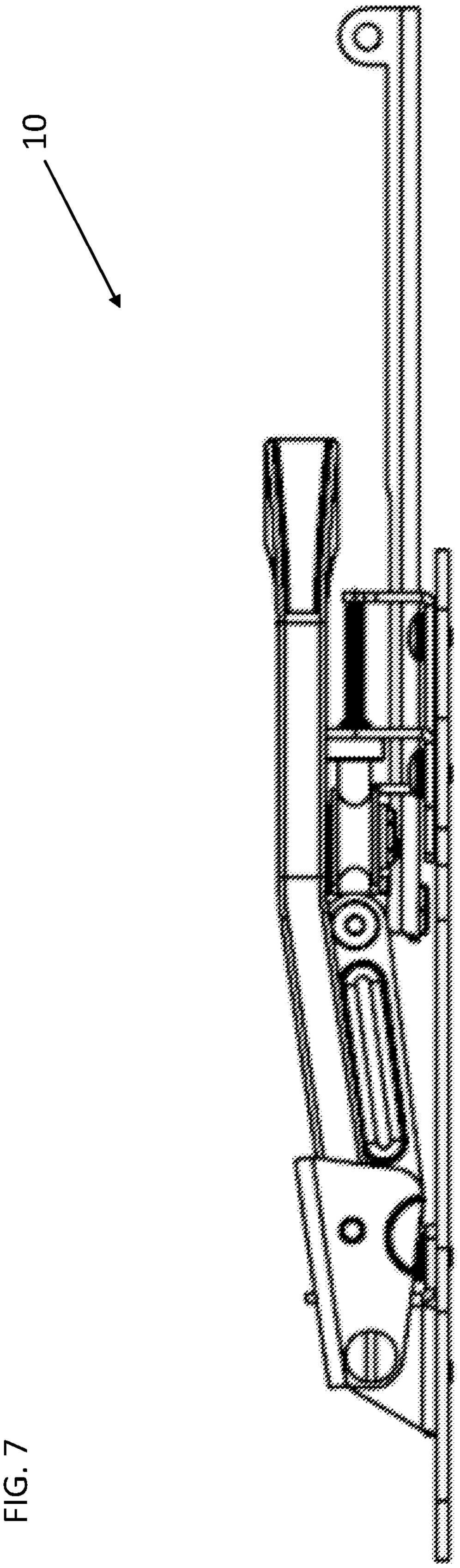
FIG. 7 is a side view of the actuator assembly according to aspects of the present invention.

The actuator system 10 includes a pair of rails 46, 48 which cooperate with a floating tail piece assembly 50 and truss lock 52 to effect folding and unfolding of the fretted stringed instrument according to aspects of the present invention. The rails 46, 48 extend between the lower mounting plates 18, 20 and an upper mounting plate 54. As best shown in FIG. 4, the lower mounting plates 18, 20 are equipped with shaft guides 19, which loosely constrain the lower ends of the rails 46, 48. The upper ends of the rails 46, 48 may be fixedly coupled to the upper mounting plate 54, such as via a lock-nut or the like. The floating tail piece assembly 50 includes a pair of rollers 56, 58 dimensioned to engage with (and preferably roll along) the rails 46, 48 when the tail piece assembly 50 moves along the rails 46, 48. The tail piece assembly 50 moves along the rails 46, 48 in two manners: 1) under compression from the truss lock 52, which is used to position the tail piece assembly 50 such that strings (e.g. guitar strings) are elongated and tightened for tuning and instrument play; and 2) under tension of springs 60, 62 coupled to the upper mounting plate 54, which occurs after the truss lock 52 is moved away from the tail piece assembly 50 and the tension of the instrument strings pulls the tail piece assembly 50 away from the upper mounting plate 54.

The truss lock 52 is coupled to the handle guides 14, 16 via a pair of linkages 64. Bolts 61, 63 are used to rotatably couple the linkages 64 to the handle guides 14, 16, and bolts 65, 67 are used to rotatably couple the linkages 64 to the truss lock 52. When the handle assembly 12 is locked within the handle guides 14, 16 (via pins 32, 34), the truss lock 52 will be forced into movement along the rails 46, 48 as the handle member 12 is rotated during use. A ram rod 68 is coupled to the truss lock 52 via a binding post assembly 70. Although not shown, the ram rod 68 is coupled to one or more locking rods that serve to lock and unlock a mid-neck hinge assembly in the neck of the fretted stringed instrument.

Figure 10:
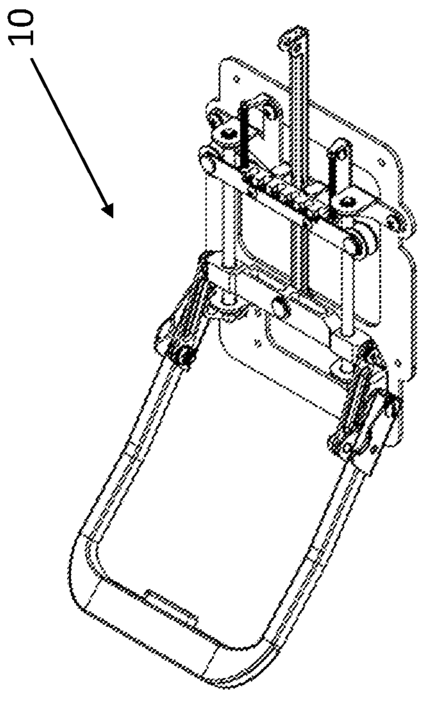
FIGS. 8-10 are perspective views of the actuator assembly in use during the process of rotating a handle from a stored state to retract a ram rod and release a floating tail piece assembly, which is the first phase of using the actuator assembly to fold a fretted instrument according to aspects of the present invention.
Figure 9:
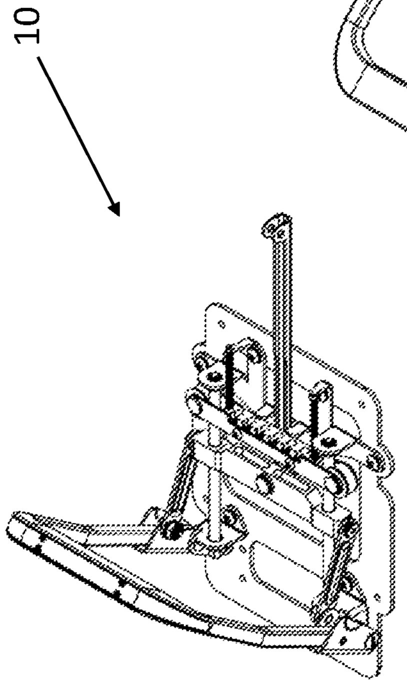
Figure 8:
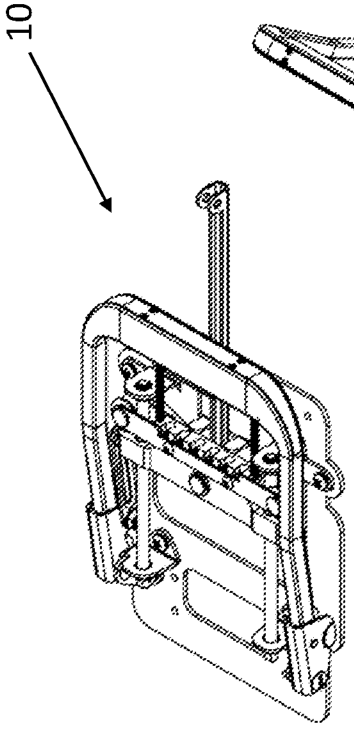
Figures 17, 18, 19:
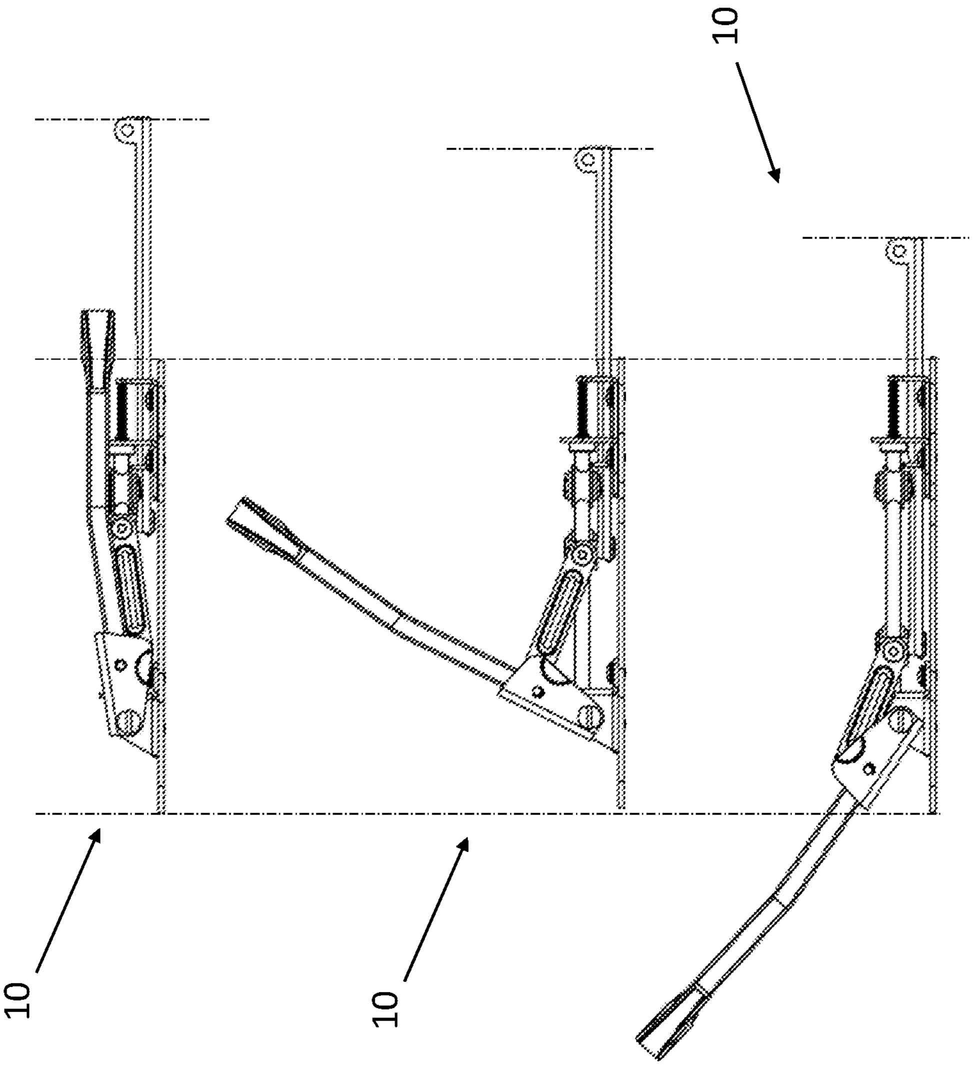
FIGS. 17-19 are side views of the actuator assembly in use during the process of rotating the handle shown in FIGS. 8-10, which is the first phase of using the actuator assembly to fold a fretted instrument according to aspects of the present invention.

FIGS. 8-10 (perspective views) and FIG. 17-19 (side views) show the actuator assembly 10 in use during the process of rotating a handle assembly 12 from a stored state to retract the ram rod 62 and release the floating tail piece assembly 50, which is the first phase of using the actuator assembly 10 to fold a fretted instrument according to aspects of the present invention. To do so, a user need simply use the grip 24 to pull the handle assembly 12 from the stored state within a recess formed in the back of the body of the stringed instrument. This forces the handle guides 14, 16 and the arm members 26, 28 into rotation about the binding posts 15 extending through the lower mounting plates 18, 20. This moves the truss lock 52 along the rails 46, 48 away from the floating tail piece assembly 50, due to the connection of the linkages 64, 66 which extend between the handle guides 14, 16 and the lateral ends of the truss lock 52. The ram rod 62 is coupled to the truss lock 52 such that the ram rod 62 moves from the position shown in FIG. 8 (fully extended) to that shown in FIG. 10 (fully retracted). The ram rod 62 is coupled to locking pins (not shown) that serve to lock the hinge of the stringed instrument when in the fully extended state (FIG. 8) and to unlock the hinge of the stringed instrument when in the fully retracted state (FIG. 10).

Figure 12:
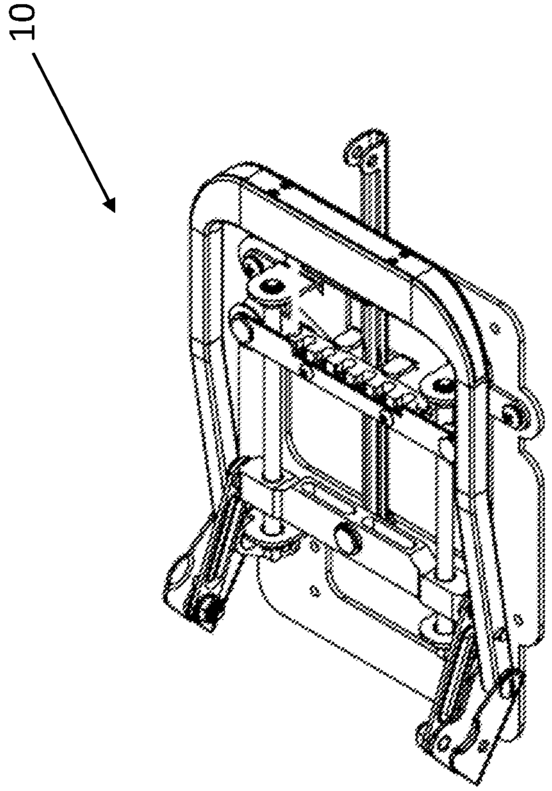
FIGS. 11-12 are perspective views of the actuator assembly in use during the process of rotating the handle back to the stored state after disengaging with rotating handle guides, which is the second phase of using the actuator assembly to fold a fretted instrument according to aspects of the present invention.
Figure 11:
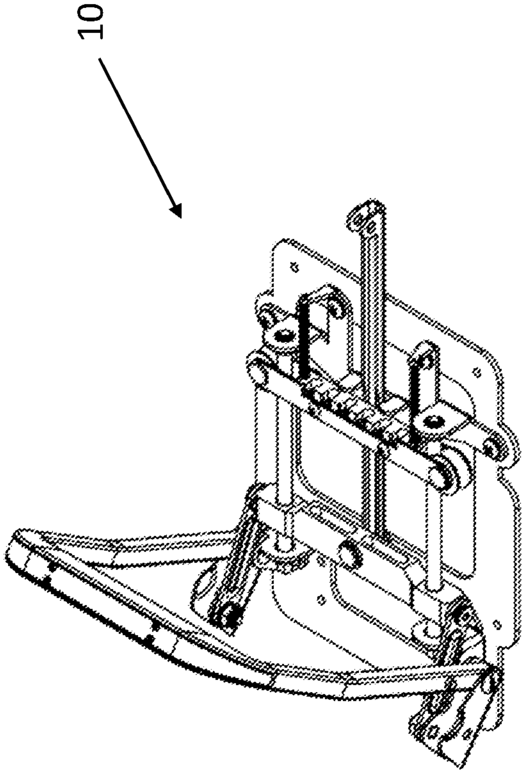
Figures 20, 21:
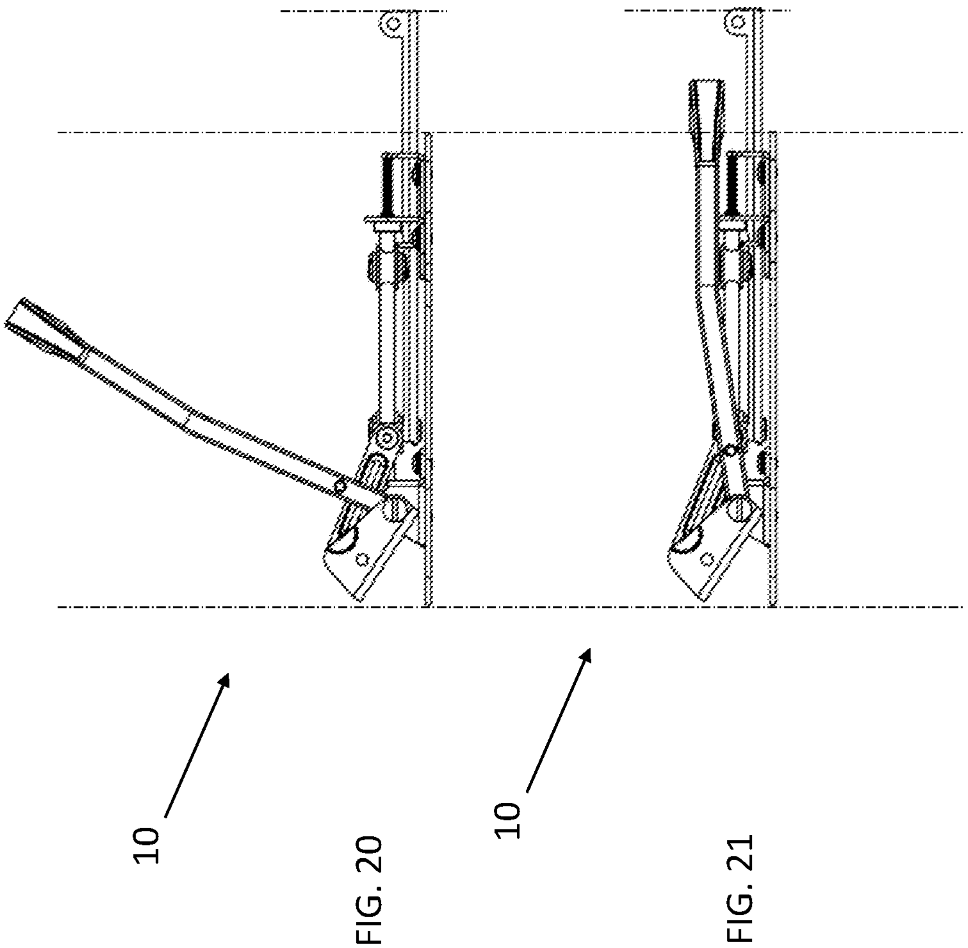
FIGS. 20-21 are side views of the actuator assembly in use during the process of rotating the handle shown in FIGS. 11-12, which is the second phase of using the actuator assembly to fold a fretted instrument according to aspects of the present invention.

FIGS. 11-12 (perspective views) and FIGS. 20-21 (side views) show the actuator assembly 10 in use during the process of rotating the handle assembly 12 back to the stored state after disengaging with rotating handle guides 14, 16, which is the second phase of using the actuator assembly 10 to fold a fretted instrument according to aspects of the present invention. To disengage or unlock the arm members 26, 28 from the handle guides 14, 16, the button 30 is depressed (to overcome one or more internally disposed springs) to pull the ends of the cable assembly 32 upwards towards the grip 24, which forces the wedges 27 into engagement with the spring clips 33 to retract the locking pins 34 such that the arm members 26, 28 may be disengaged/unlocked from the handle guides 14, 16. In this state, the handle assembly 12 may be rotated and stored within a recess formed in the back of the body of the stringed instrument as shown in FIG. 12, after which the neck of the stringed instrument may be folded over the actuator assembly 10.

Figure 14:
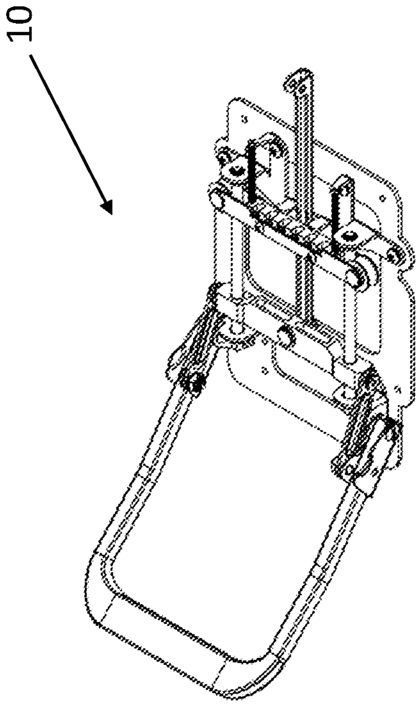
FIGS. 13-14 are perspective views of the actuator assembly in use during the process of rotating the handle from the stored state to reengage with the rotating handle guides, which is the first phase of using the actuator assembly to unfold a fretted instrument according to aspects of the present invention.
Figure 13:
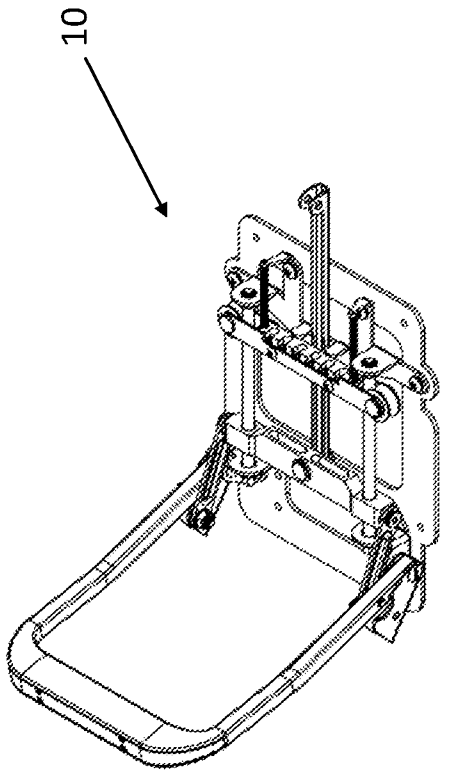
Figure 22:
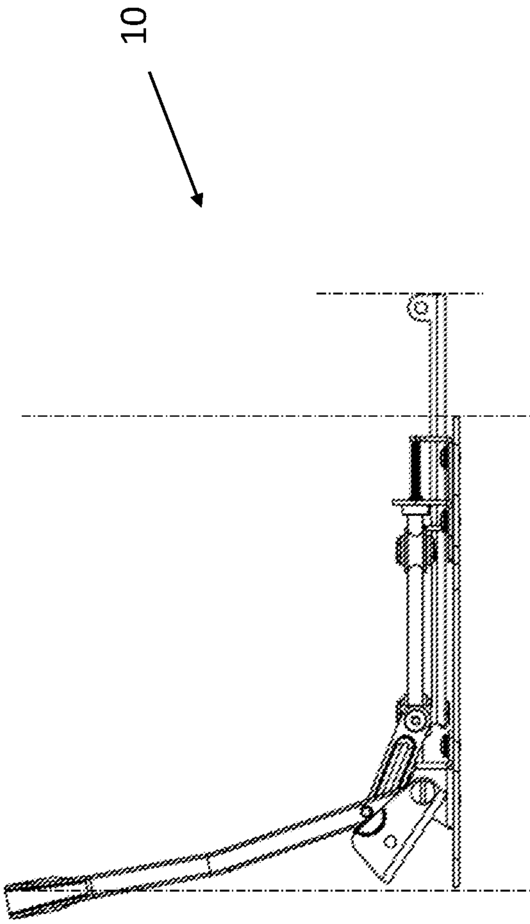
FIGS. 22-23 are side views of the actuator assembly in use during the process of rotating the handle shown in FIGS. 13-14, which is the first phase of using the actuator assembly to unfold a fretted instrument according to aspects of the present invention.
Figure 23:
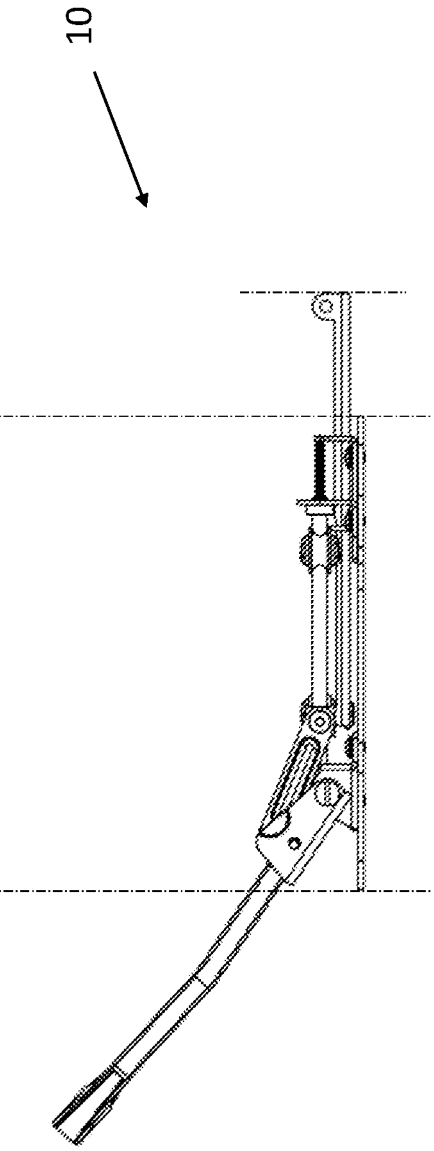

FIGS. 13-14 (perspective views) and FIGS. 22-23 (side views) show the actuator assembly 10 in use during the process of rotating the handle assembly 12 from the stored state to reengage with the rotating handle guides 14, 16, which is the first phase of using the actuator assembly 10 to unfold a fretted instrument according to aspects of the present invention. The handle assembly 12 is pulled from the stored state (FIG. 12) until the arm members 26, 28 are rotated into positioned within the handled guides 14, 16. When this occurs, the locking pins 34 are forced into contact with the beveled section 36 of the handle guides 14, 16. The contact between the beveled section 36 and the locking pins 34 overcomes the spring force of the spring clip 33 and thereby causes the locking pins 34 to retract within the arm members 26, 28 until the locking pins 34 are aligned with the apertures formed in the outer wall of the handle guides 14, 16. When this co-alignment occurs, the locking pins 34 extend through the aperture formed in the outer walls of the handle guides 14, 16 to effectively lock the arm members 26, 28 within the handle guides 14, 16.

Figure 16:
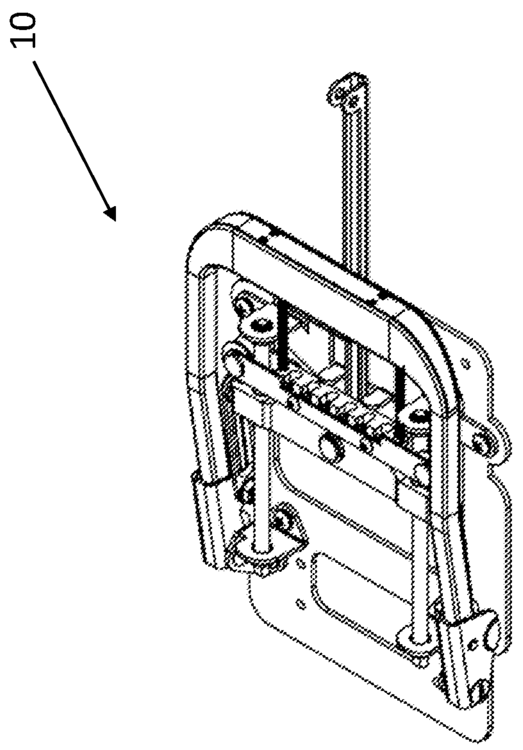
FIGS. 15-16 are perspective views of the actuator assembly in use during the process of rotating the handle back to the stored state after reengaging with rotating handle guides to deploy the ram rod and secure the floating tail piece assembly, which is the second step of using the actuator assembly to unfold a fretted instrument according to aspects of the present invention.
Figure 15:
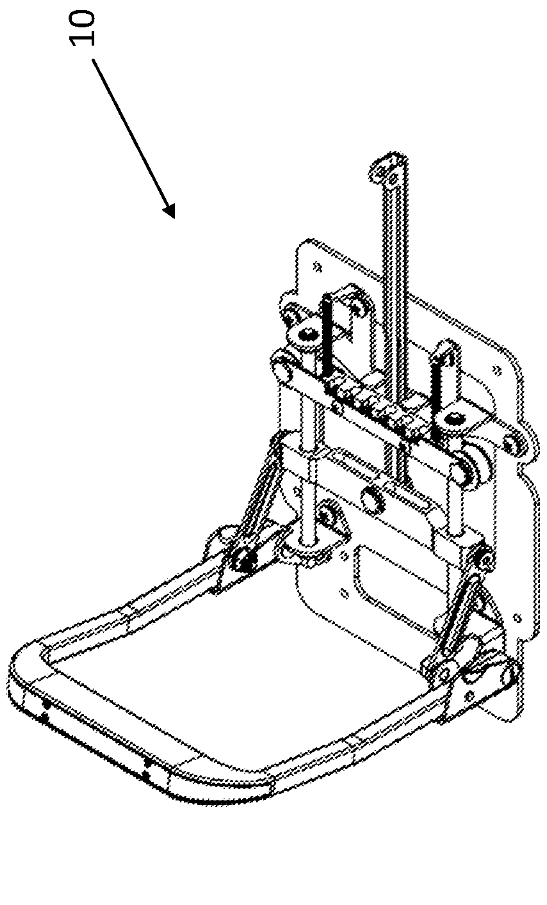
Figure 24:
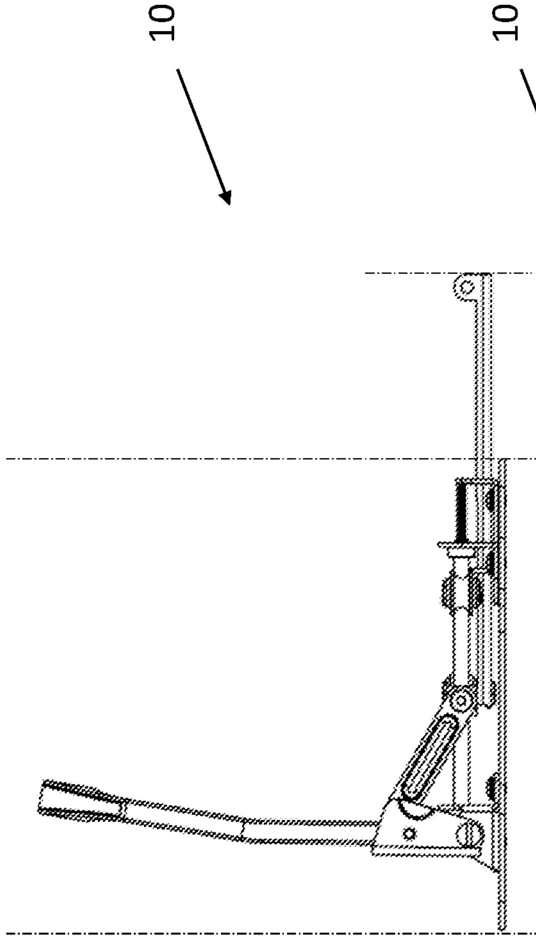
FIGS. 24-25 are side views of the actuator assembly in use during the process of rotating the handle shown in FIGS. 15-16, which is the second step of using the actuator assembly to unfold a fretted instrument according to aspects of the present invention.
Figure 25:
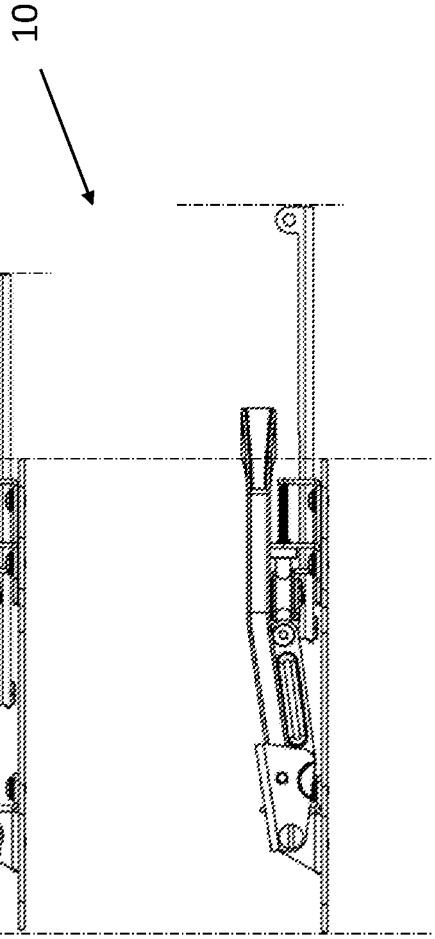
Figure 26C:
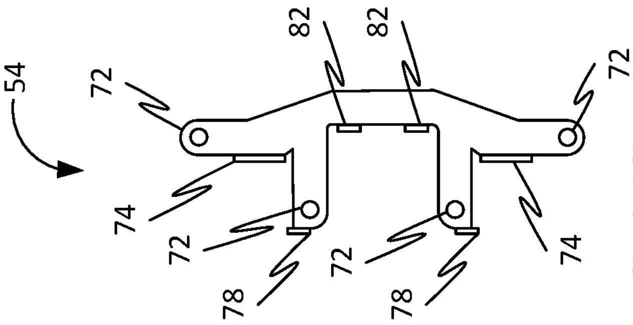
FIGS. 26A-26E are various views of an upper rail mounting plate forming part of the actuator assembly of FIGS. 1-7 according to aspects of the present invention.
Figure 26E:
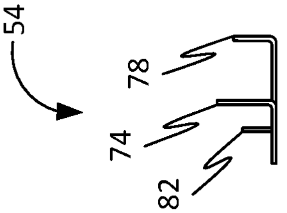
Figure 26B:
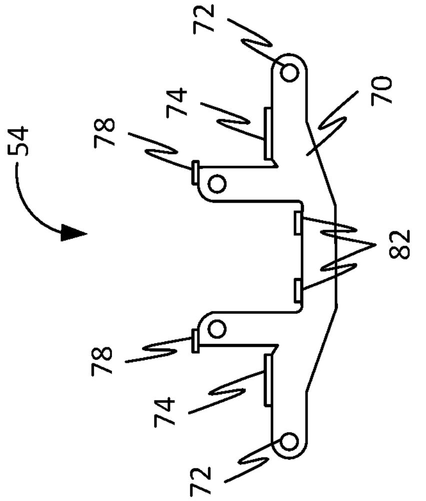
Figure 26D:
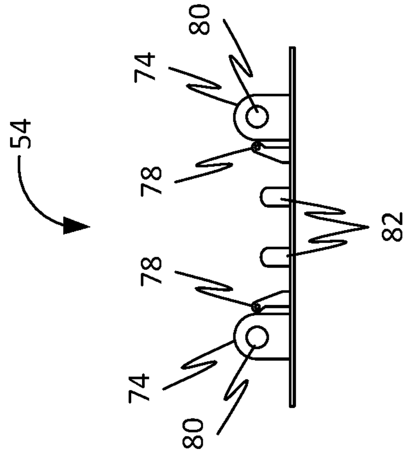
Figure 26A:
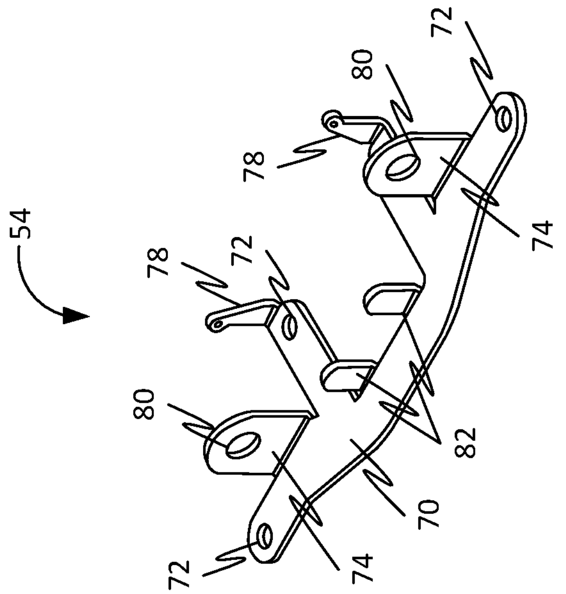
Figure 27A:
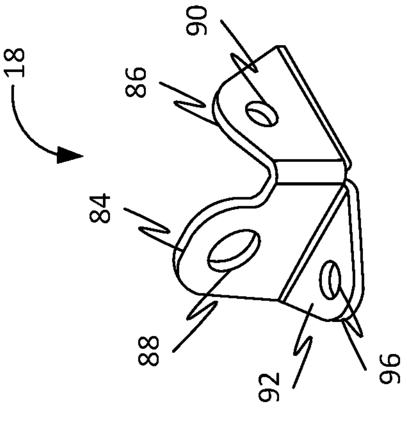
FIGS. 27A-27D are various views of a first lower rail mounting plate forming part of the actuator assembly of FIGS. 1-7 according to aspects of the present invention.
Figure 27B:
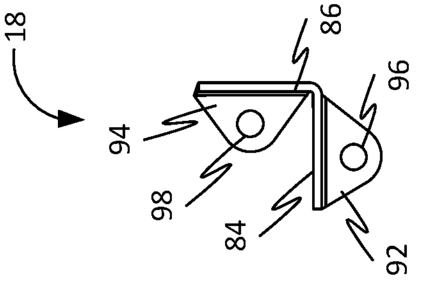
Figure 27C:
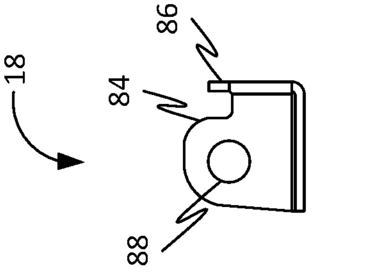
Figure 27D:
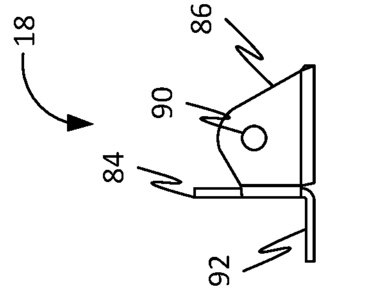
Figure 28A:
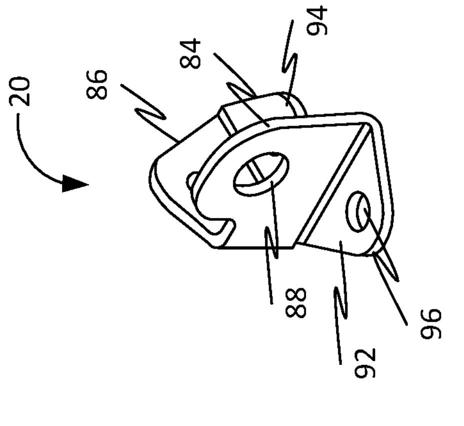
FIGS. 28A-28D are various views of a second lower rail mounting plate forming part of the actuator assembly of FIGS. 1-7 according to aspects of the present invention.
Figure 28B:
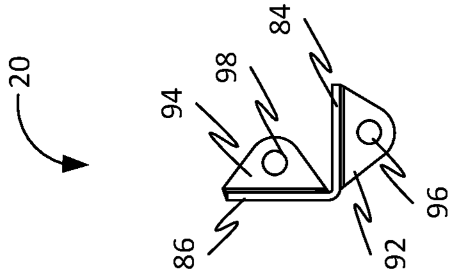
Figure 28C:
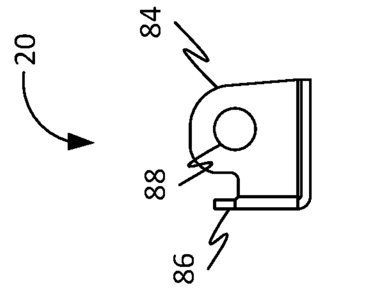
Figure 28D:
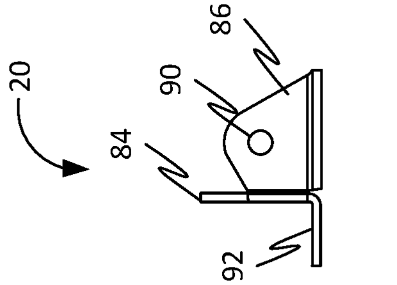

FIGS. 15-16 (perspective views) and FIGS. 24-25 (side views) show the actuator assembly 10 in use during the process of rotating the handle assembly 12 back to the stored state after reengaging with rotating handle guides 14, 16 to deploy the ram rod 62 and secure the floating tail piece assembly 52, which is the second step of using the actuator assembly 10 to unfold a fretted instrument according to aspects of the present invention. Once the handle assembly 12 has been locked in place within the handle guides 14, 16, a user may rotate the handle assembly 12 back towards the stored position of FIG. 16. Doing so will drive the truss lock 52 along the rails 46, 48 due to the operation of the linkages 64, 66 that extend between the handle guides 14, 16 and the truss lock 52. The movement of the truss lock 52 along the rails 46, 48 will force the truss lock 52 into abutment with the floating tail piece assembly 50 such that the floating tail piece assembly 50 is moved along the rails 46, 48 towards the upper mounting plate 54. The strings of the stringed instrument are anchored within the floating tail piece assembly 50 such that, when it is positioned as shown in FIGS. 16 and 25, the strings will be at full tension such that they can be tuned for play, typically with very minimal tuning required (e.g. less than 1 half step for guitars). Movement of the truss lock 52 also drive the ram rod 62 into the fully extended position (FIG. 25) also serve to drive locking rods into the hinge of the stringed instrument such that the stringed instrument is ready for play.

By way of example, the actuator assembly 10 includes a chassis comprising a first plate member (e.g., base plate 22) configured to be adhered within the back recess 206 of the body 204 and a plurality of secondary plate members (e.g., upper mounting plate 54, first lower mounting plate 18, and/or second lower mounting plate 20) extending generally perpendicularly from the first plate member.

FIGS. 26A-26E are various views of an upper mounting plate 54 forming part of the actuator assembly 10 of FIGS. 1-7 according to aspects of the present invention. The upper mounting plate 54 includes a base 70 with a plurality of mounting holes 72 for coupling the upper mounting plate 54 to the base plate 22, preferably via machine screws threaded into threaded apertures formed in the base plate 22. A pair of first vertical tabs 74 extend from the base 70, which each include an aperture 80 dimensioned to receive a first (threaded) end of the rails 46, 48. The threads of the first ends of the rails 46, 48 engage into a nut or other capture mechanism (e.g. PEM stud with internal threads) disposed adjacent to or forming part of the vertical tabs 74. A second pair of vertical tabs 78 extend from the base 70, which each include a small aperture to engage the first end of the springs 60, 62 forming part of the floating tail piece assembly 50. A third pair of tabs 82 extend from the base 70, which collectively form a barrier for the upper edge of the floating tail piece assembly 50 when the truss lock 52 pushes it into the fully constrained state shown in FIGS. 1-7.

FIGS. 27A-27D are various views of a first lower mounting plate 18 forming part of the actuator assembly 10 of FIGS. 1-7 according to aspects of the present invention. The first lower mounting plate 18 includes a first wall 84 and a second wall 86 disposed generally perpendicular to one another. The first wall 84 includes an aperture 88 dimensioned to receive a second (non-threaded) end of the rails 46, 48. The second ends of the rails 46, 48 are dimensioned to have a degree of play relative to the apertures 88, for example by being loosely constrained within the shaft guide 19 shown in FIGS. 44A-44C. A pair of mounting tabs 92, 94 extend from the bottom of the first and second walls 48, 86, respectively. The mounting tabs 92, 94 include mounting apertures 96, 98, respectively, for mounting the first lower mounting plate 18 to the base 22 (such as via machine screws threaded into threaded apertures formed in the base 22). The second wall 86 includes a side aperture 90 dimensioned to receive binding posts 15 (FIG. 2) for the purpose of rotatably securing the handle guide 14 and arm member 26 to the first lower mounting plate 18.

FIGS. 28A-28D are various views of a second lower mounting plate 20 forming part of the actuator assembly 10 of FIGS. 1-7 according to aspects of the present invention. The second lower mounting plate 20 includes a first wall 84 and a second wall 86 disposed generally perpendicular to one another. The first wall 84 includes an aperture 88 dimensioned to receive a second (non-threaded) end of the rails 46, 48. The second ends of the rails 46, 48 are dimensioned to have a degree of play relative to the apertures 88, for example by being loosely constrained within the shaft guide 19 shown in FIGS. 44A-44C. A pair of mounting tabs 92, 94 extend from the bottom of the first and second walls 48, 86, respectively. The mounting tabs 92, 94 include mounting apertures 96, 98, respectively, for mounting the second lower mounting plate 20 to the base 22 (such as via machine screws threaded into threaded apertures formed in the base 22). The second wall 86 includes a side aperture 90 dimensioned to receive binding posts 15 (FIG. 2) for the purpose of rotatably securing the handle guide 16 and arm member 28 to the second lower mounting plate 20.

Figure 29:
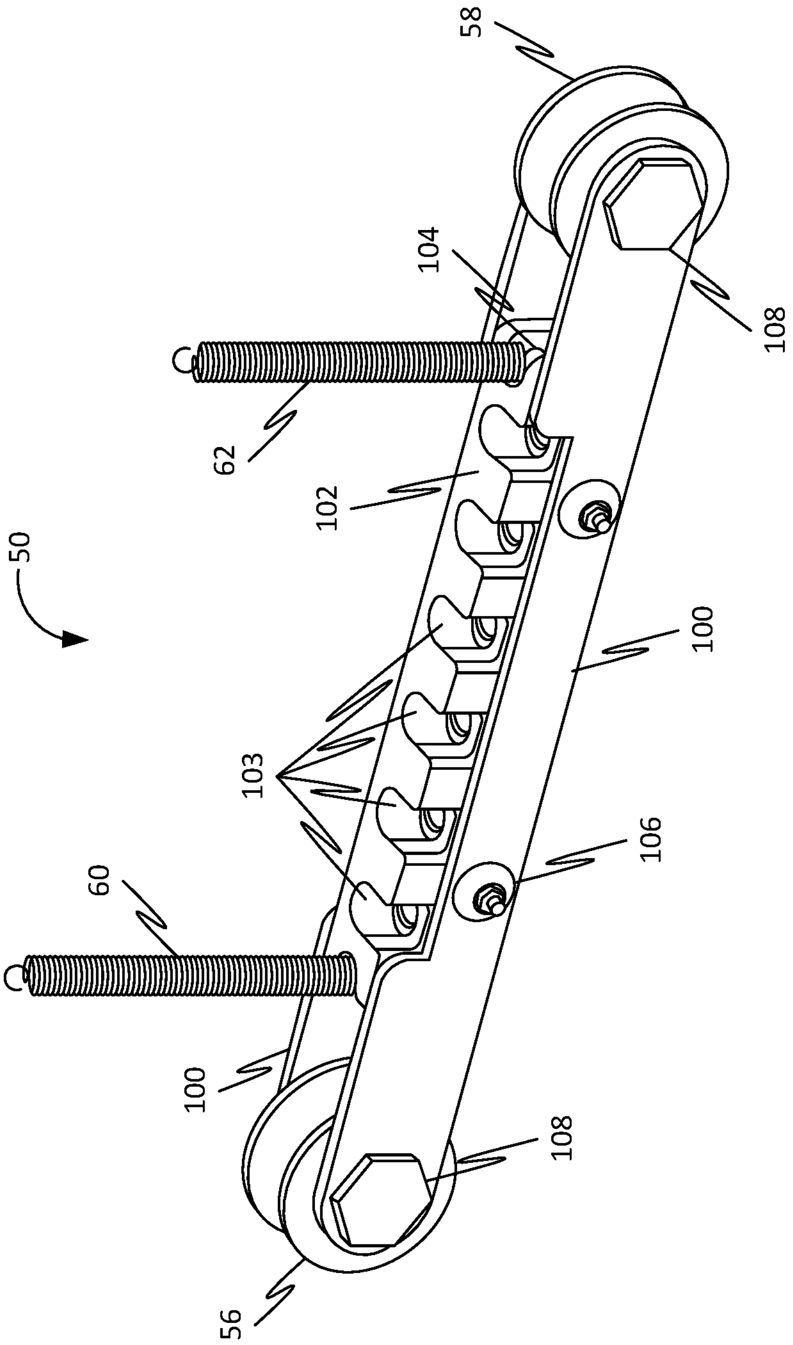
FIG. 29 is a perspective view of a floating tail piece assembly forming part of the actuator assembly of FIGS. 1-7 according to aspects of the present invention.
Figure 30A:
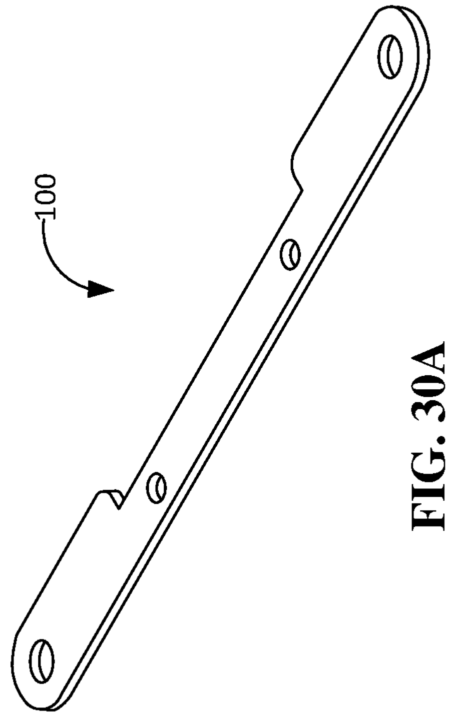
FIGS. 30A-30C are various views of a plate forming part of the floating tail piece assembly of FIG. 29 according to aspects of the present invention.
Figure 30B:
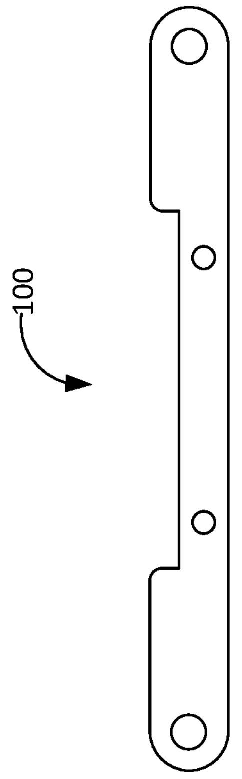
Figure 30C:
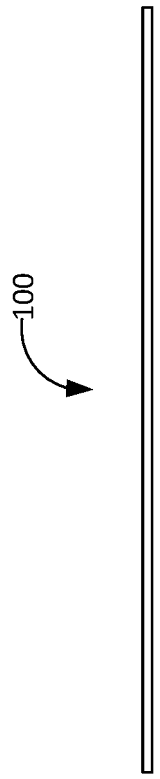
Figure 31A:
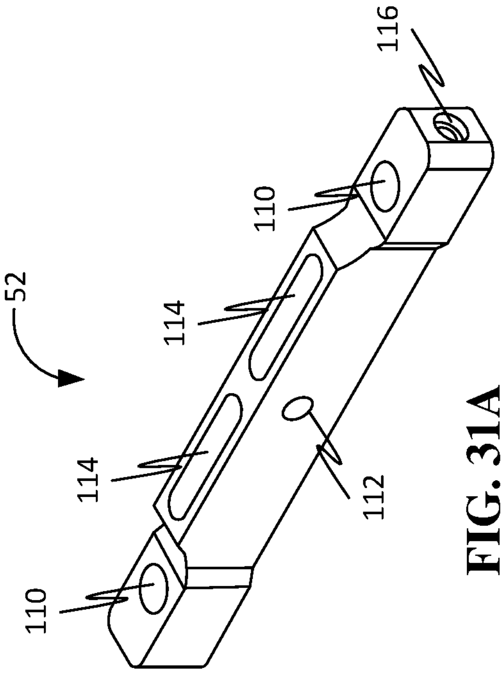
FIGS. 31A-31D are various views of a truss lock member forming part of the actuator assembly of FIGS. 1-7 according to aspects of the present invention.
Figure 31B:
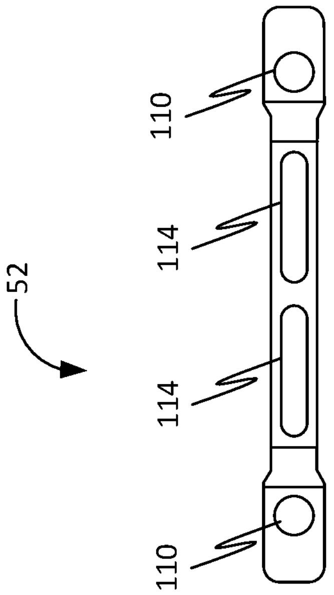
Figure 31C:
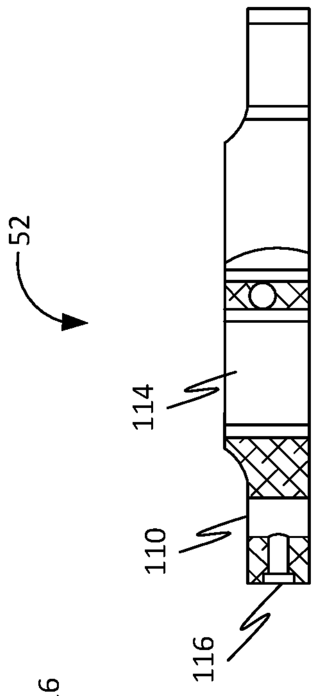
Figure 31D:
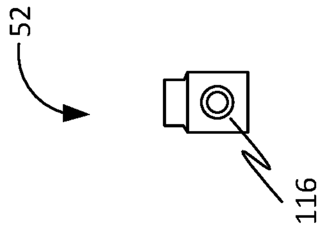
Figure 32B:
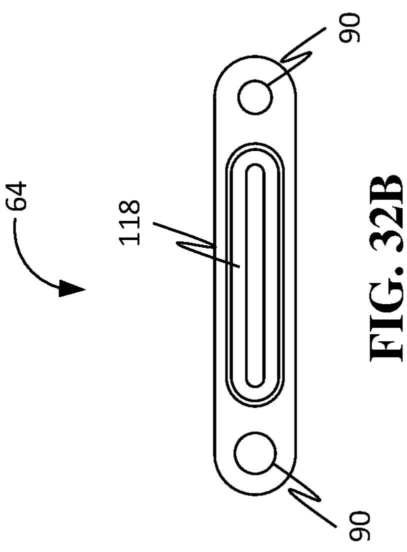
FIGS. 32A-32D are various views of a linkage member forming part of the actuator assembly of FIGS. 1-7 according to aspects of the present invention.
Figure 32C:
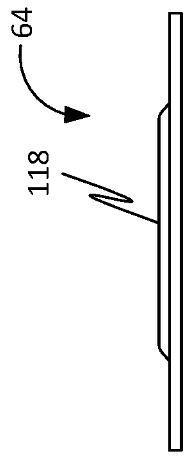
Figure 32D:
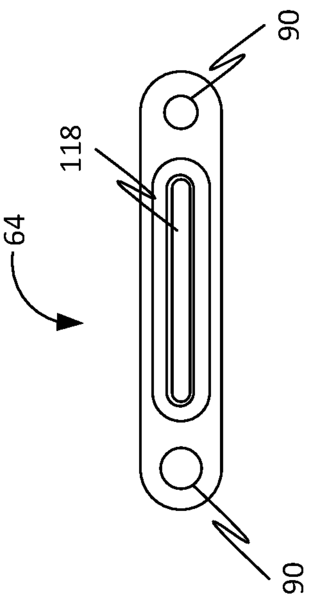
Figure 32A:
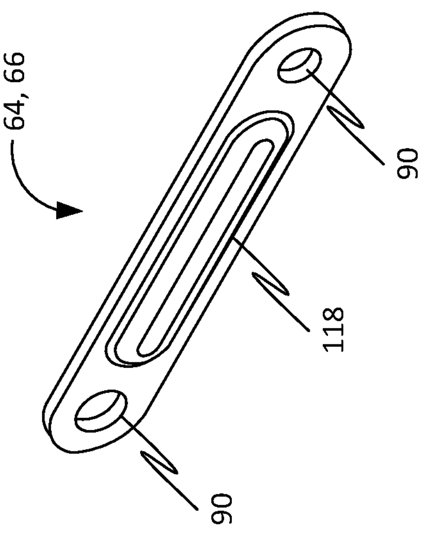
Figure 33E:
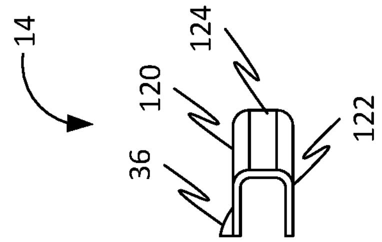
FIGS. 33A-33E are various views of a first handle guide forming part of the actuator assembly of FIGS. 1-7 according to aspects of the present invention.
Figure 33B:
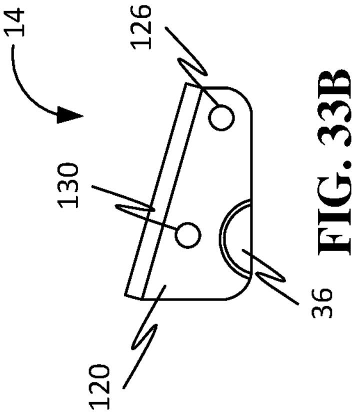
Figure 33C:
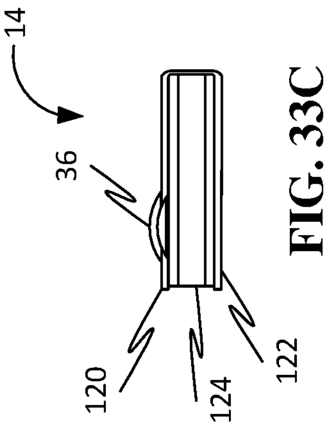
Figure 33D:
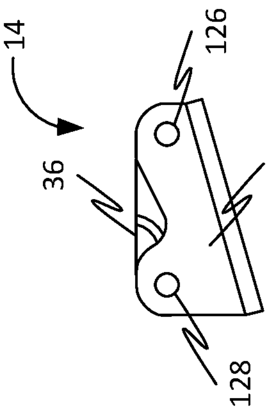
Figure 33A:
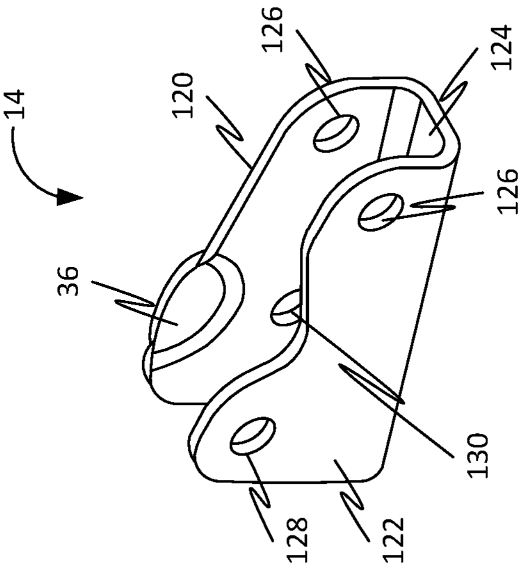
Figure 34E:
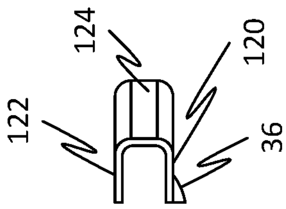
FIGS. 34A-34E are various views of a second handle guide forming part of the actuator assembly of FIGS. 1-7 according to aspects of the present invention.
Figure 34B:
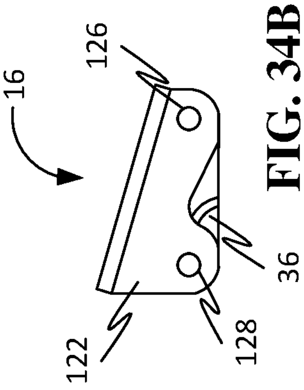
Figure 34C:
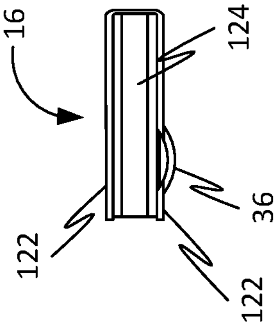
Figure 34D:
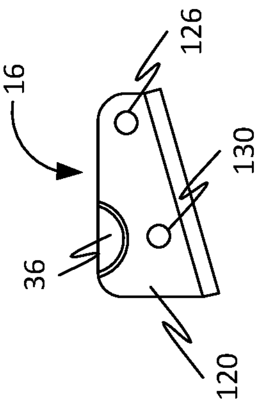
Figure 34A:
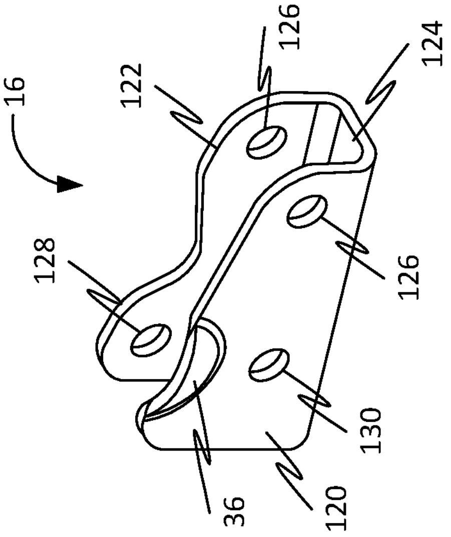
Figures 35A, 35B, 35C, 35D, 35E:
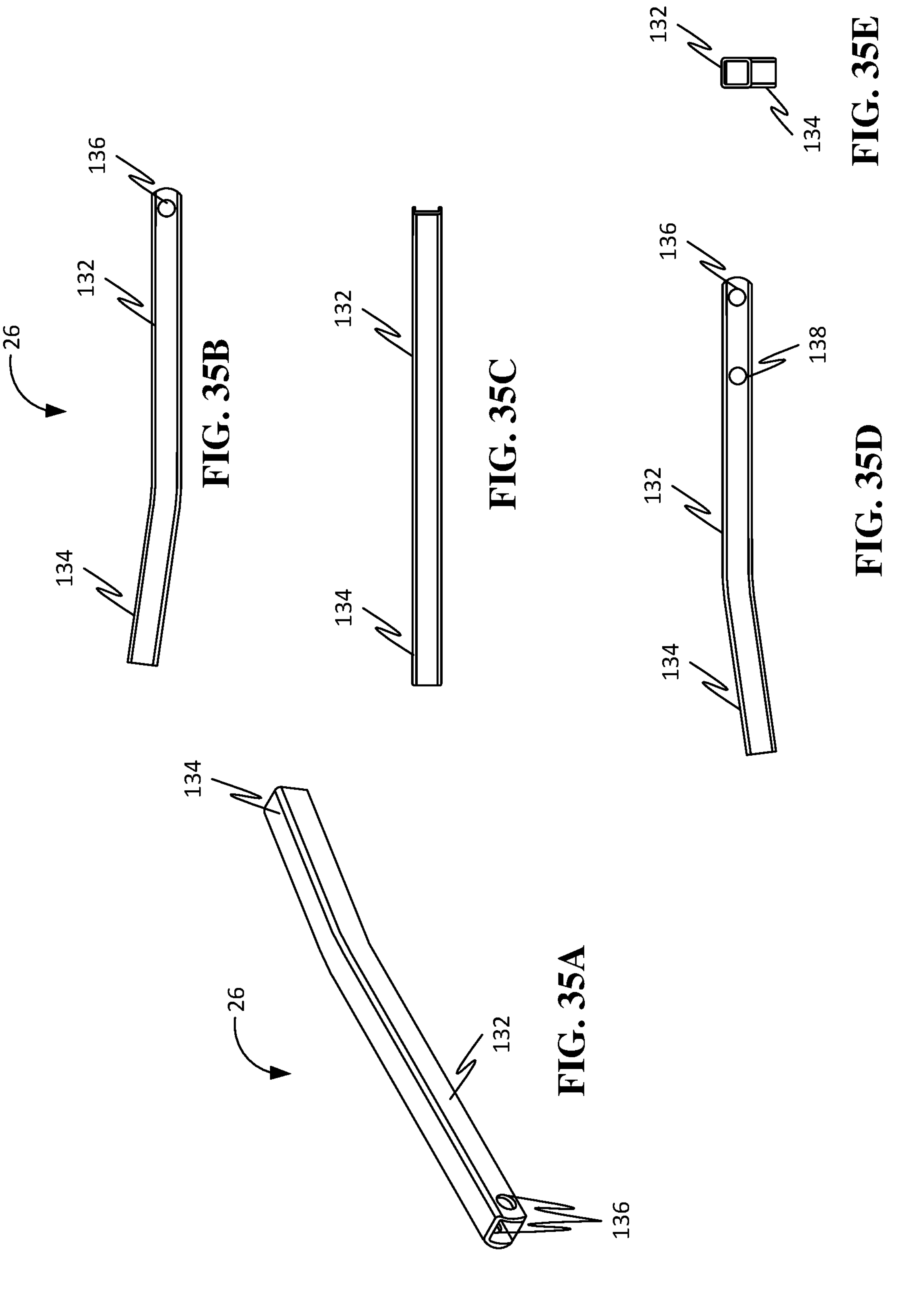
FIGS. 35A-35E are various views of a first handle arm forming part of the actuator assembly of FIGS. 1-7 according to aspects of the present invention.
Figures 36A, 36B, 36C, 36D, 36E:
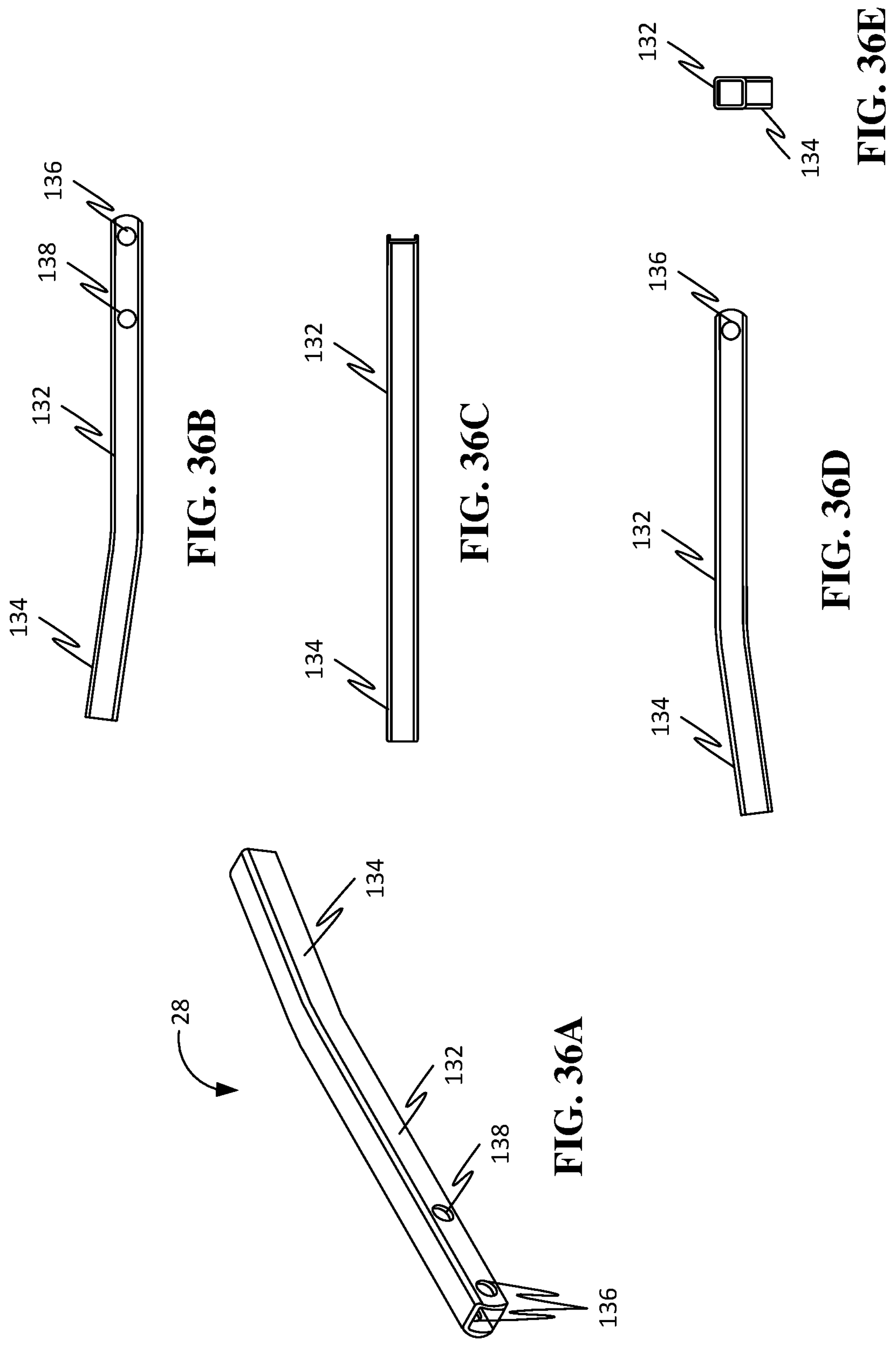
FIGS. 36A-36E are various views of a second handle arm forming part of the actuator assembly of FIGS. 1-7 according to aspects of the present invention.
Figure 38B:
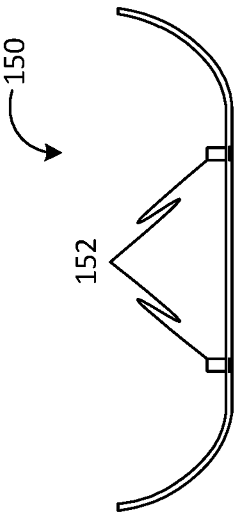
FIGS. 38A-38F are various views of a handle cap forming part of the actuator assembly of FIGS. 1-7 according to aspects of the present invention.
Figure 38C:
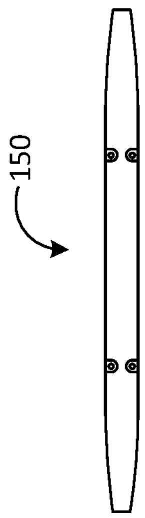
Figure 38D:
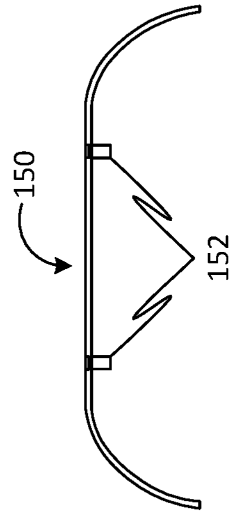
Figure 38E:
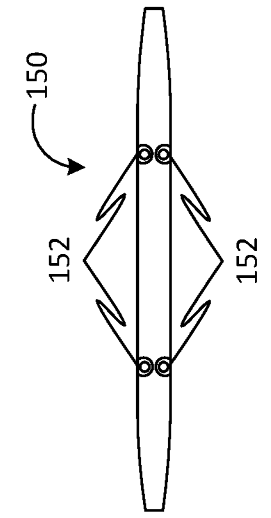
Figure 38F:
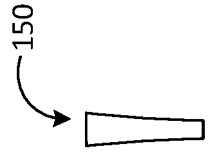
Figure 38A:
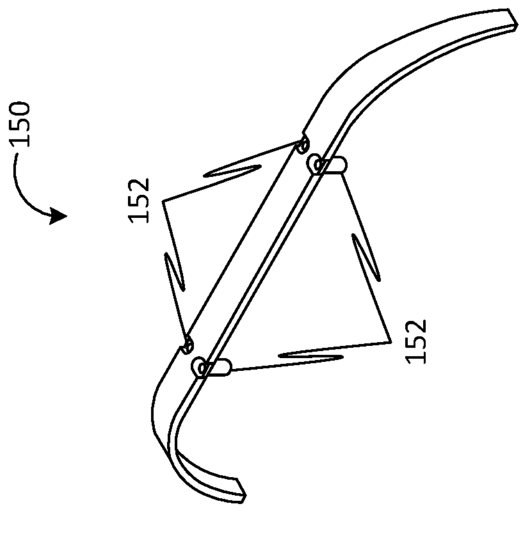

FIG. 29 is a perspective view of a floating tail piece assembly 50 forming part of the actuator assembly 10 of FIGS. 1-7 according to aspects of the present invention. The floating tail piece assembly 50 includes a pair of elongated plates 100 mounted on either side of a tail piece 102 via a plurality of machine screws 106 (2 per plate 100). As shown in FIGS. 30A-30C, the elongated plates 100 include apertures to receive the machine screws 106 and also apertures to receive binding posts 108 for the purpose of rotatably mounting the rollers 56, 58 shown in FIG. 29. The rollers 56, 58 are dimensioned to roll along the lateral sides of the rails 46, 48, which are positioned within a gap between the rollers 56, 58 and the tail piece 102, as shown (by way of example only) in FIG. 1. The lower ends of the springs 60, 62 are mounted to the tail piece 102 and serve to exert a tension force on the floating tail piece assembly 50 to bias it towards the third pair of vertical tabs 82 of the upper mounting plate 54. The tail piece 102 includes a plurality of apertures 103 (for example, six (6) for guitars) dimensioned to receive the bulbous ends of the instrument strings. When the floating tail piece assembly 50 is locked in place as shown in FIGS. 1-7, the tail piece 102 serves to anchor the instrument strings such that they may be tuned for play. When the floating tail piece assembly 50 is released (that is, when the handle assembly 12 is rotated to move the truss lock 52 away from the floating tail piece assembly 50), the tension on the strings will be significantly reduced (from fully tuned tension of 118 lbs. for guitar strings) and the floating tail piece assembly 50 will translate away from the upper mounting plate 54 along the rails 46, 48 as the springs 60, 62 elongate. In this state, the strings of the instrument will be at a reduced state (e.g. approximately 3-5 lbs. for guitar strings) such that the strings won't be kinked when they fold over the hinge of the neck of the stringed instrument. The springs 60, 62 will extend to accommodate the travel of the strings as they follow-the-fold over the neck hinge during the folding process.

Figure 1:
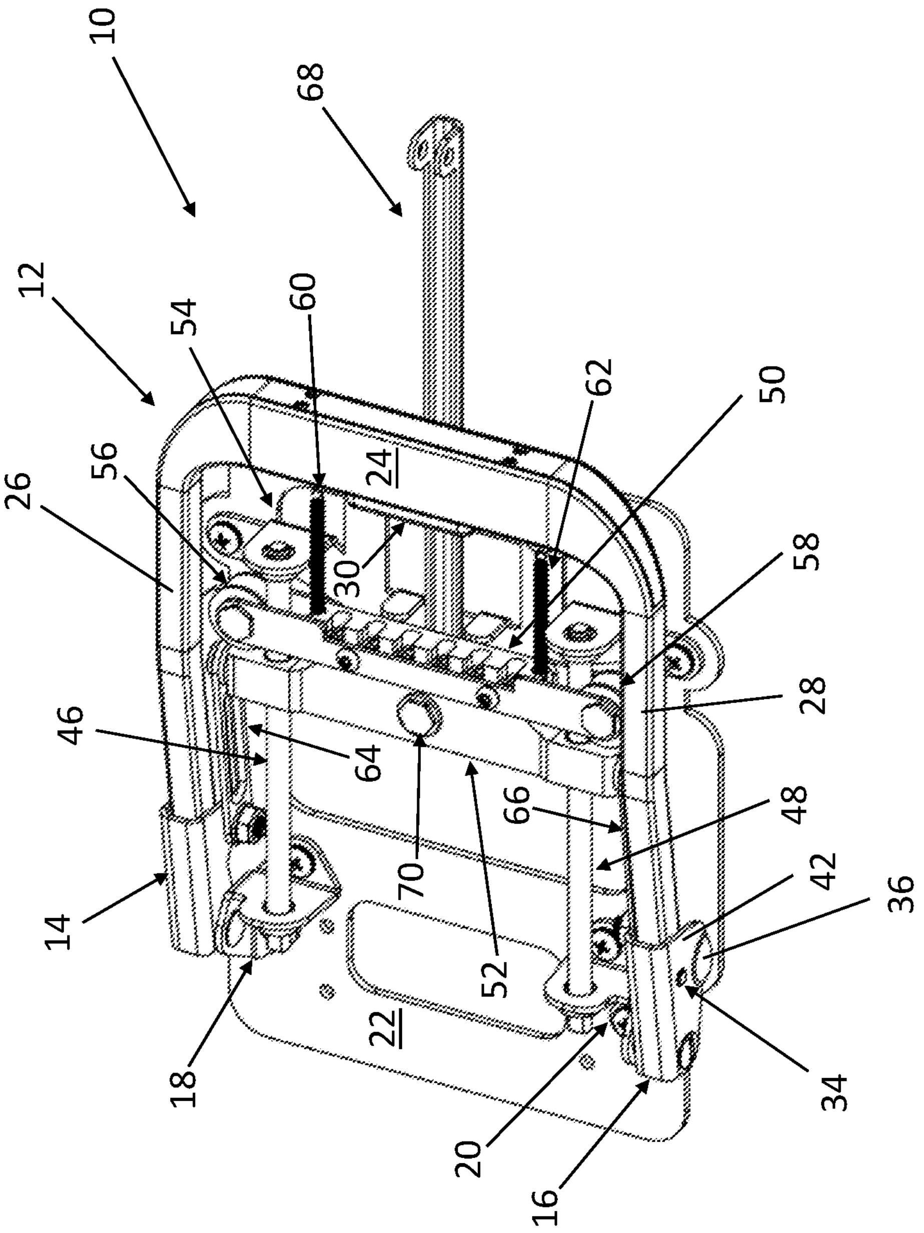
FIGS. 1-2 are perspective views (assembled and exploded) of an actuator assembly forming part of a folding mechanism for a foldable fretted instrument according to aspects of the present invention.
Figure 2:
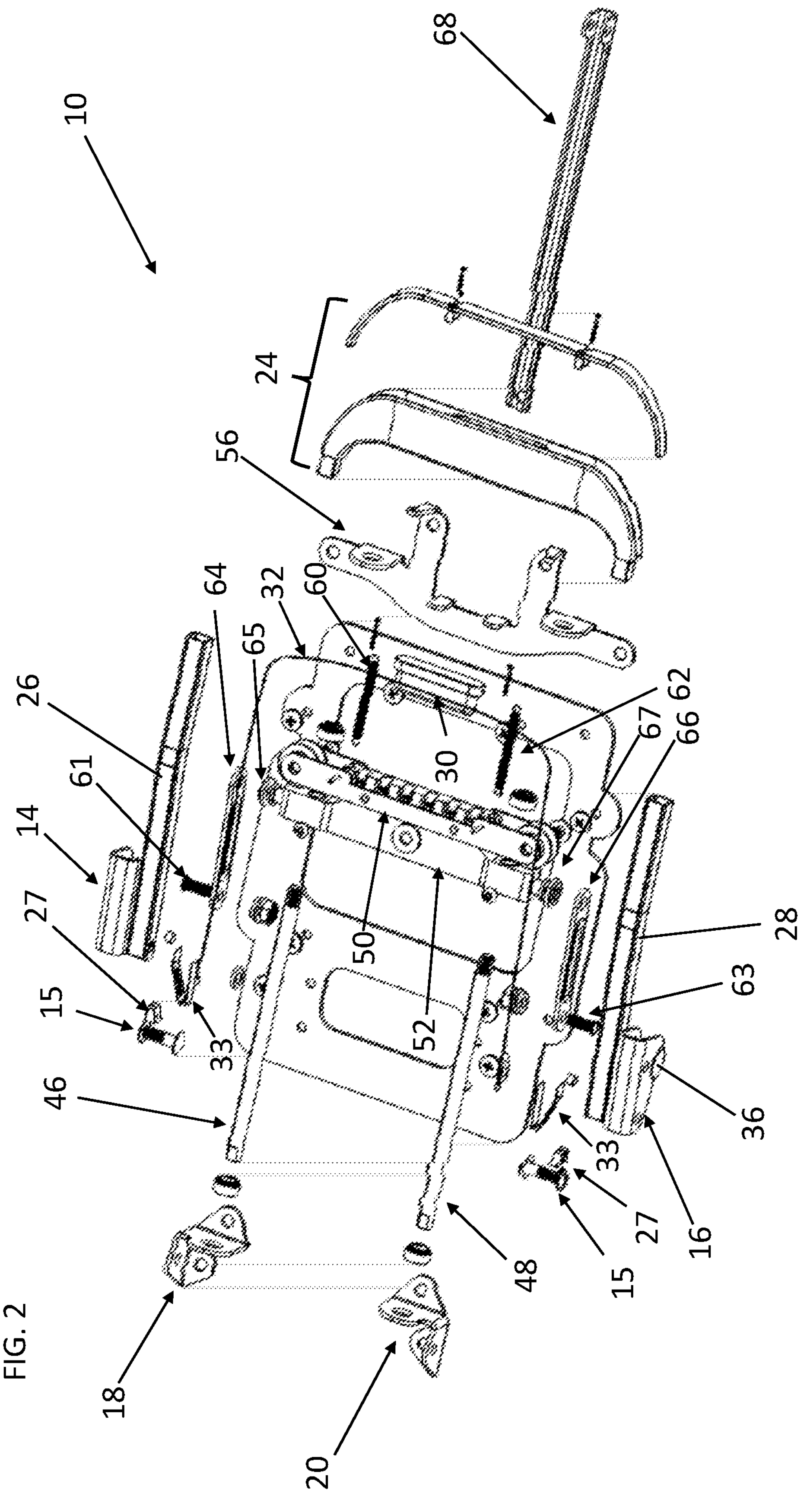
Figure 3:
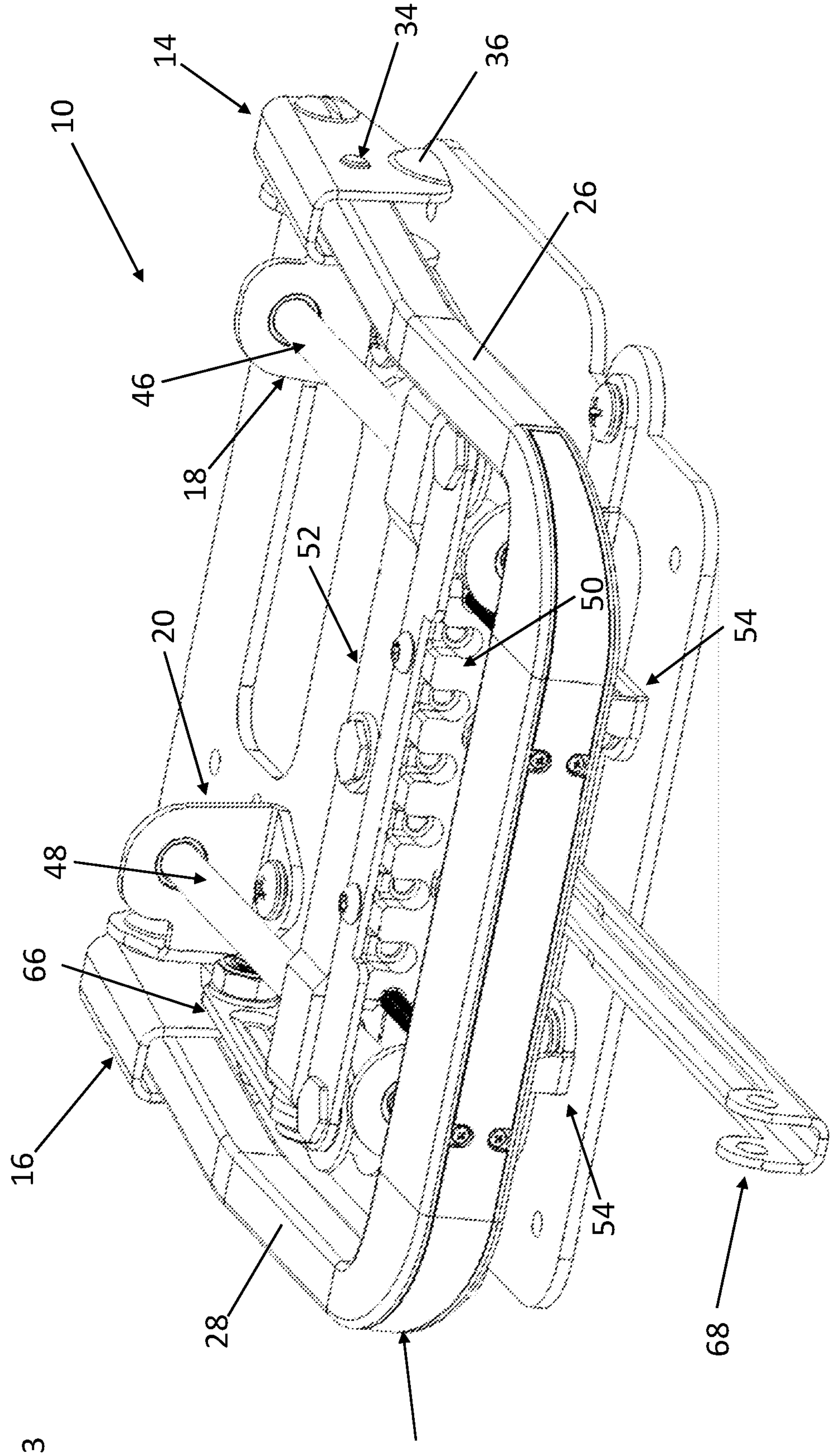
FIGS. 3-4 are perspective views (front and back) top and bottom views of the actuator assembly according to aspects of the present invention.

FIGS. 31A-31D are various views of the truss lock member 52 forming part of the actuator assembly 10 of FIGS. 1-7 according to aspects of the present invention. The truss lock member 52 includes a pair of rail bores 110 dimensioned to slidably receive and pass the rails 46, 48 such that the truss lock 52 may be translated along the rails 46, 48 under the direction of the handle assembly 12. The truss lock 52 includes a mounting aperture 112 dimensioned to receive the binding post 70 for coupling the ram rod 62 to the truss lock 52, as shown in FIG. 1. The truss lock 52 includes a pair of string aperture 114 dimensioned to pass the instrument strings from the tail piece assembly 50 in route to a string roller assembly (not shown) mounted to the base plate 22, which in turn allows the strings to pass through an string aperture formed in the body of the instrument for eventual connection to tuning machines located on a head-stock on the end of the neck of the instrument. The truss lock 52 includes a pair of side apertures 116 dimensioned to receive bolts 65, 67 for the purpose of rotatably mounting the linkages 64, 66 to the truss lock 52.

FIGS. 32A-32D are various views of the linkage members 64, 66 forming part of the actuator assembly 10 of FIGS. 1-7 according to aspects of the present invention. Each linkage 64, 66 includes a pair of mounting holes 90 and stiffening rib 118. The mounting holes 90 are dimensioned to receive bolts 61, 63 for rotatably coupling the lower end of the linkages 64, 66 to the handle guides 14, 16, and bolts 65, 67 for rotatably coupling the upper end of the linkage 64, 66 to the side apertures 116 of the truss lock 52. The stiffening rib 118 is an indented section that provides additional structural rigidity to the linkage members 64, 66 to withstand the forces being transferred from the handle guides 14, 16 to the truss lock 52 due to the rotation of the handle assembly 12 when the arm members 26, 28 are engaged within the handle guides 14, 16.

FIGS. 33A-33E are various views of the first handle guide 14 forming part of the actuator assembly 10 of FIGS. 1-7 according to aspects of the present invention. The first handle guide 14 includes an outer side wall 120, an inner side wall 122, and a base 124 extending therebetween. The side walls 120, 122 are generally parallel to one another and spaced apart a sufficient distance to receive the arm member 26 of the handle assembly 12. A pair of apertures 126 are formed along one end of the inner and outer side walls 120, 122. The apertures 126 are dimensioned to receive the binding posts 15 to rotatably couple the handle guide 14 to the side aperture 90 of the second wall 86 of the lower mounting plate 18, as well as to rotatably couple the arm member 26 within the handle guide 14. The inner wall 122 includes a side aperture 128 dimensioned to receive bolt 61 for the purpose of securing the lower end of the linkage 64 to the handle guide 14. The outer wall 120 includes a locking aperture 130 located adjacent to the beveled section 36. The locking aperture 130 is dimensioned to receive the locking pin 34 of the spring clip 33 when the arm member 26 is fully rotated into position in between the walls 120, 122 of the handle guide 14. As the handle assembly 12 is rotated towards the fully engaged position, the locking pin 34 of the spring clip 33 will come into contact with the beveled section 36 and progressively force the locking pin 34 into a retracted state within the arm member 26 until the locking pin 34 is aligned with the locking aperture 130. When so aligned, the locking pin 34 will extend out of the locking aperture 130 under the force of the spring clip 33 to effectively lock the arm member 26 within the handle guide 14.

FIGS. 34A-34E are various views of the second handle guide 16 forming part of the actuator assembly 10 of FIGS. 1-7 according to aspects of the present invention. The second handle guide 16 includes an outer side wall 120, an inner side wall 122, and a base 124 extending therebetween. The side walls 120, 122 are generally parallel to one another and spaced apart a sufficient distance to receive the arm member 28 of the handle assembly 12. A pair of apertures 126 are formed along one end of the inner and outer side walls 120, 122. The apertures 126 are dimensioned to receive the binding posts 15 to rotatably couple the handle guide 16 to the side aperture 90 of the second wall 86 of the lower mounting plate 20, as well as to rotatably couple the arm member 28 within the handle guide 16. The inner wall 122 includes a side aperture 128 dimensioned to receive bolt 63 for the purpose of securing the lower end of the linkage 64 to the handle guide 16. The outer wall 120 includes a locking aperture 130 located adjacent to the beveled section 36. The locking aperture 130 is dimensioned to receive the locking pin 34 of the spring clip 33 when the arm member 28 is fully rotated into position in between the walls 120, 122 of the handle guide 16. As the handle assembly 12 is rotated towards the fully engaged position, the locking pin 34 of the spring clip 33 will come into contact with the beveled section 36 and progressively force the locking pin 34 into a retracted state within the arm member 28 until the locking pin 34 is aligned with the locking aperture 130. When so aligned, the locking pin 34 will extend out of the locking aperture 130 under the force of the spring clip 33 to effectively lock the arm member 28 within the handle guide 16.

FIGS. 35A-35E are various views of the first arm member 26 forming part of the actuator assembly 10 of FIGS. 1-7 according to aspects of the present invention. The arm member 26 includes a lower section 132 and an upper section 134, which are both hollow in construction and angled relative to one another. The lower section 132 includes a pair of mounting apertures 126 dimensioned to receive the binding posts 15 to rotatably couple the arm member 26 within the handle guide 14. The lower section 132 is dimensioned to receive the spring clip 33 (FIGS. 39A-39C) and the wedge member 27 (FIGS. 40A-40D), which form part of the system for selectively locking and unlocking the handle assembly 12 from the handle guides 14, 16. The spring clip 33 is positioned within the lower section 132 such that the locking pin 34 extends through a locking aperture 138 formed in the outer wall of the lower section 132 due to the force of the spring clip 33. The locking pin 34 may be retracted from or within the locking aperture 138 in two manners. First, the locking pin 34 may be retracted due to the operation of the button 30 of the handle assembly 12, which serves to pull the wedge 27 upwards within the lower section 132 (via cable assembly extending between the button 30 and the wedges 27) until it overcomes the force of the spring clip 33 to remove the locking pin 34 from the locking aperture 138. Second, the locking pin 34 may be forcibly pushed into the locking aperture 138 due to the beveled section 36 of the outer wall 120 of the handle guide 14 when the arm member 26 enters the handle guide 14 due to the rotation of the handle assembly 12 during the step of reengaging the handle assembly 12 to the handle guide 14 as shown in FIGS. 13-14 and 22-23.

FIGS. 36A-36E are various views of the second arm member 28 forming part of the actuator assembly 10 of FIGS. 1-7 according to aspects of the present invention. The arm member 28 includes a lower section 132 and an upper section 134, which are both hollow in construction and angled relative to one another. The lower section 132 includes a pair of mounting apertures 126 dimensioned to receive the binding posts 15 to rotatably couple the arm member 28 within the handle guide 16. The lower section 132 is dimensioned to receive the spring clip 33 (FIGS.

39A-39C) and the wedge member 27 (FIGS. 40A-40D), which form part of the system for selectively locking and unlocking the handle assembly 12 from the handle guides 14, 16. The spring clip 33 is positioned within the lower section 132 such that the locking pin 34 extends through a locking aperture 138 formed in the outer wall of the lower section 132 due to the force of the spring clip 33. The locking pin 34 may be retracted from or within the locking aperture 138 in two manners. First, the locking pin 34 may be retracted due to the operation of the button 30 of the handle assembly 12, which serves to pull the wedge 27 upwards within the lower section 132 (via cable assembly extending between the button 30 and the wedges 27) until it overcomes the force of the spring clip 33 to remove the locking pin 34 from the locking aperture 138. Second, the locking pin 34 may be forcibly pushed into the locking aperture 138 due to the beveled section 36 of the outer wall 120 of the handle guide 14 when the arm member 28 enters the handle guide 16 due to the rotation of the handle assembly 12 during the step of reengaging the handle assembly 12 to the handle guide 16 as shown in FIGS. 13-14 and 22-23.

FIGS. 37A-38F are various views of a grip base 140 (FIGS. 37A-37F) and a grip cover 150 (FIGS. 28A-28F) forming the handle grip 24 of the actuator assembly 10 of FIGS. 1-7 according to aspects of the present invention. Collectively, the grip base 140 and grip cover 150 provide a purchase point for a user to use the actuator assembly 10 (including the button 30 shown in FIGS. 41A-41D) for loosening and tightening the strings, as well as unlocking and locking the hinge of the neck of the stringed instrument, for the purpose of folding and unfolding the stringed instrument via the steps shown in FIGS. 8-25.

As best shown in FIG. 37A, the grip base 140 is a molded part having a central channel 142, end extensions 144, a button aperture 146, and a cable groove 148 extending along the middle of the central channel 142 on either side of the button aperture 146. The end extensions 144 are dimensioned to fit into the open ends of the upper sections 134 of the arm members 26, 28 to secure the grip body 140 to the arm members 26, 28, which fixation may be augmented via screws or the like extending through the wall(s) of the arm members 26, 28 and into the end extensions 144. The button aperture 146 is dimensioned to slidably receive the button 30 of FIGS. 41A-41D. The cable groove 148 is dimensioned to slidably guide the top section of the cable assembly 32 of FIG. 42. The central groove 142 includes a plurality of screw housings 153, which correspond to a plurality of screw housings 152 extending from the lower surface of the grip cover 150, as best viewed in FIGS. 38A-38F. Each screw housing 152, 153 is dimensioned to receive a screw for the purposes of mounting the grip cover 150 to the grip base 140.

Figure 39B:
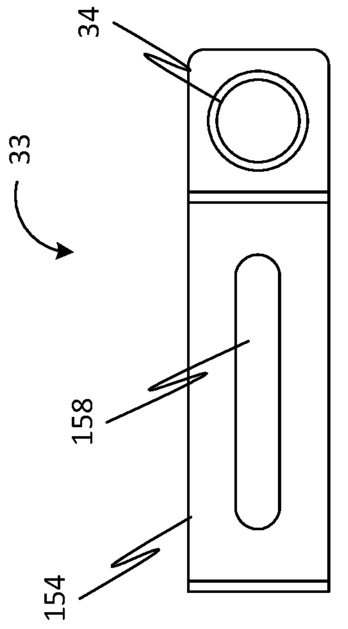
FIGS. 39A-39C are various views of a locking spring clip forming part of the actuator assembly of FIGS. 1-7 according to aspects of the present invention.
Figure 39C:
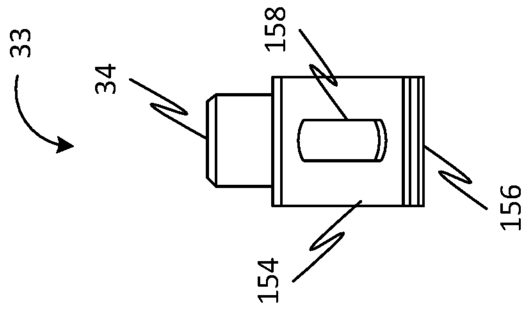
Figure 39A:
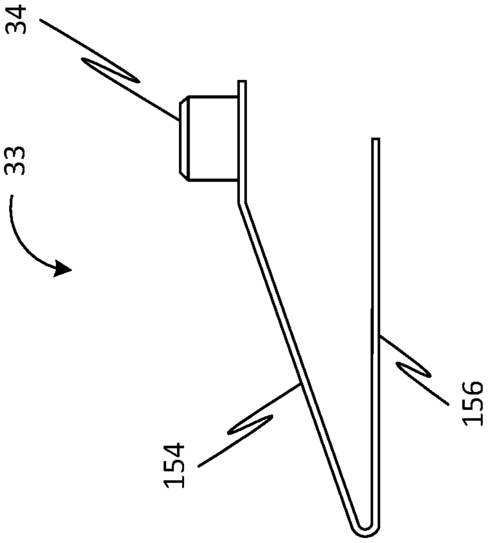
Figure 40D:
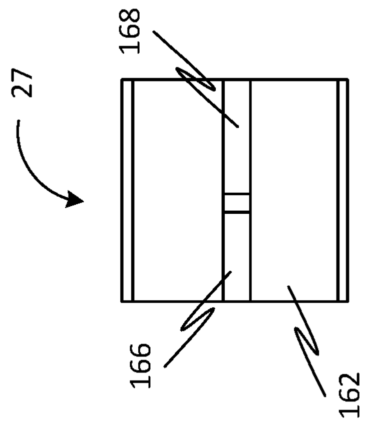
FIGS. 40A-40D are various views of a wedge member forming part of the actuator assembly of FIGS. 1-7 according to aspects of the present invention.
Figure 40B:
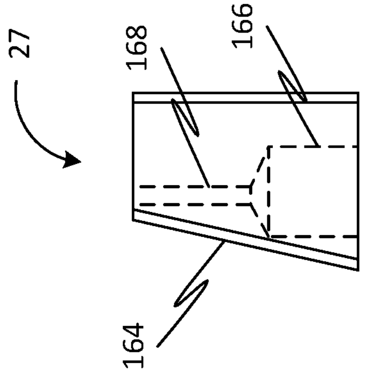
Figure 40C:
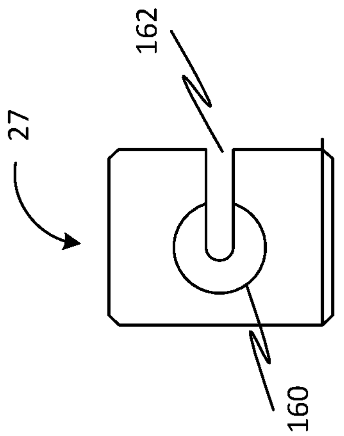
Figure 40A:
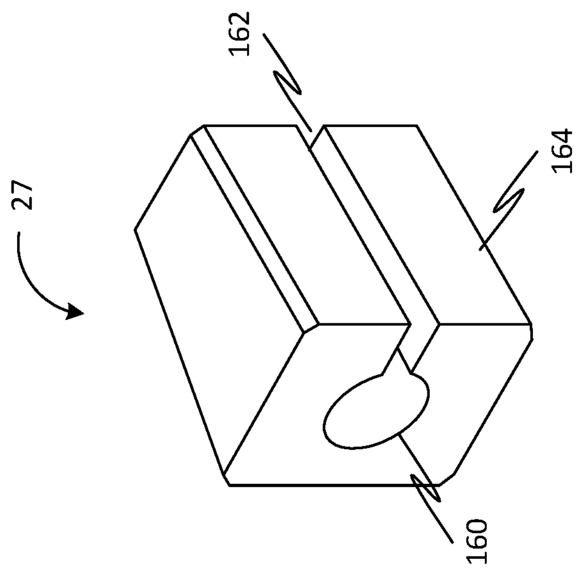
Figure 41A:
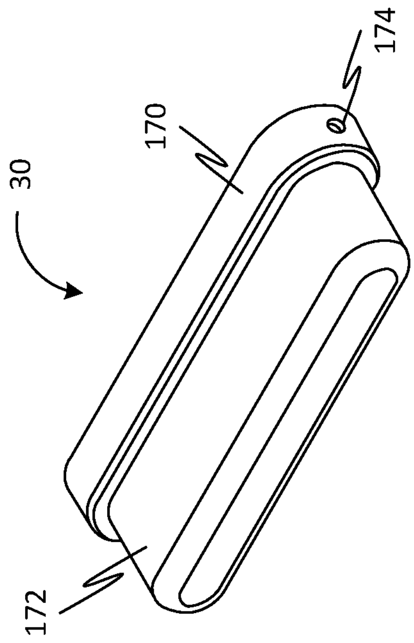
FIGS. 41A-41D are various views of a handle release button forming part of the actuator assembly of FIGS. 1-7 according to aspects of the present invention.
Figure 41B:
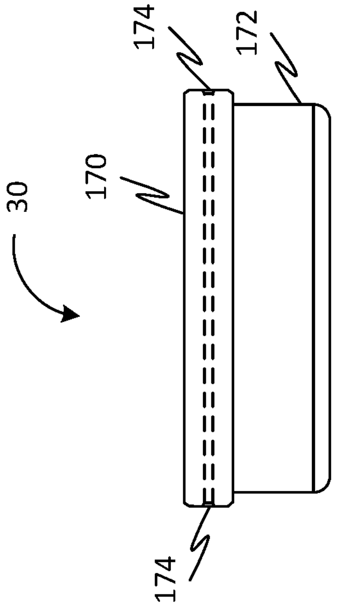
Figure 41C:
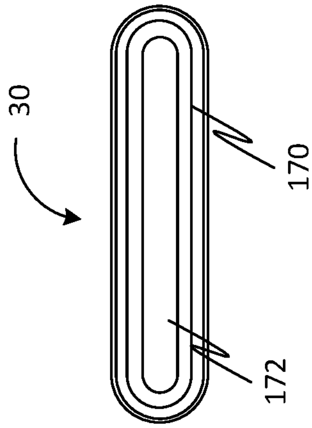
Figure 41D:
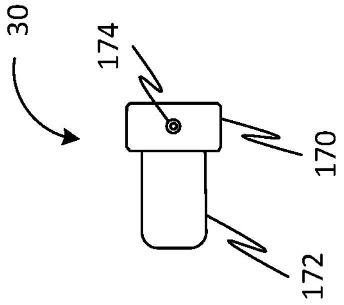

FIGS. 39A-39C are various views of the locking spring clip 33 forming part of the actuator assembly 10 of FIGS. 1-7 according to aspects of the present invention. The locking clip 33 includes a ramped section 154 and a base section 156, which are contiguously formed from spring steel and configured to resist against any forces that act upon or otherwise bias the ramped section 154 towards to the base section 156. The ramped section 154 has an elongated slot 158 dimensioned to pass the lower section of the cable assembly 32 during operation of the spring clip 33 in both modes of deformation. In the first mode, the cable 32 passes through the ramped section 154 when the spring clip 33 is deformed due to the wedges 27 moving under operation of the button 30 and the cable assembly 32, which serves to disengage the arm members 26, 28 from the handle guides 14, 16 (as shown in FIGS. 11-12 and 20-21). In the second mode, the cable 32 passes through the ramped section 154 when the spring clip 33 is deformed due to the beveled section 36 of the handle guides 14, 16 acting against the locking pins 34 when the arm members 26, 28 are introduced into the handle guides 14, 16 to lock the relative to one another (as shown in FIGS. 13-14 and 22-23).

FIGS. 40A-40D are various views of the wedge member 27 forming part of the actuator assembly of FIGS. 1-7 according to aspects of the present invention. The wedge member 27 includes a longitudinal bore 160 and a side channel 162 extending between a ramped surface 164 and the bore 160. The longitudinal bore 160 and side channel 162 each extend the length of the wedge member 27. The bore 160 includes a first section 166 and a second section 168. The first second 166 has a cross sectional diameter dimensioned to receive a crimped end 180 on the terminal end of the cable 32 shown in FIG. 42. The second section 168 is dimensioned to receive the cable 32 but too narrow to receive the crimped end 180 of the cable 32. To engage the cable 32 to the wedge 27, the cable 32 is advanced along the outsider of the ramped surface 164 of the wedge 27 until the crimped end 180 extends past the wide end of the wedge 27. The cable 32 can then be advanced laterally into the side channel 162 such that the crimped end 180 is moved over and then into the first section 166 of the bore 160. In operation, the ramped surface 164 of the wedge 27 is dimensioned to slidably cooperate with the ramped section 154 of the spring clip 33 to selectively deform the clip 33 to remove the locking pin 34 from the handle guides 14, 16 to disengage the arm members 26, 28 from the handle guides 14, 16 (as shown in FIGS. 11-12 and 20-21).

FIGS. 41A-41D are various views of the handle button 30 forming part of the actuator assembly 10 of FIGS. 1-7 according to aspects of the present invention. The button 30 is molded and includes a base 170 and a button extension 172. The base 170 includes a cable bore 174 that progresses from one lateral edge of the base 170 to the other lateral edge of the base 170. The cable bore 174 is dimensioned to receive and pass the upper section of the cable 32 through the base 170 such that the cable will be moved along with the button 30 when the button extension 172 is moved within the button aperture 146. By moving the cable 32 along with the button 30, the crimped ends 180 of the cable assembly 32 will be moved upwards with the arm member 26, 28, which forces the wedges 27 into engagement with the ramped section 154 of the spring clip 33 to remove each locking pin 34 from engagement with the handle guides 14, 16. This enables the effective and quick release of the arm members 26, 28 from the handle guides 14, 16 (as shown in FIGS. 11-12 and 20-21).

Figure 42:
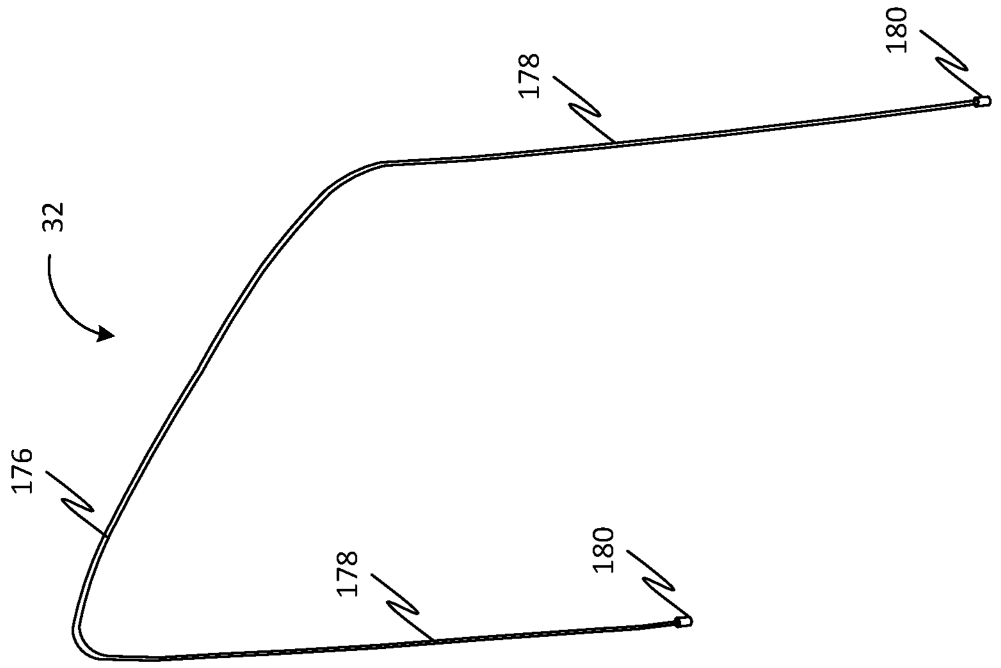
FIG. 42 is a perspective view of a cable assembly forming part of the actuator assembly of FIGS. 1-7 according to aspects of the present invention.

FIG. 42 is a perspective view of the cable assembly 32 forming part of the actuator assembly 10 of FIGS. 1-7 according to aspects of the present invention. The cable 32 includes an upper section 176 and two lower sections 178, each of which terminates with a crimped end 180. When assembled with the handle assembly 12, the upper section 176 extends through the aperture 174 of the base 170 of the button 30, which is positioned within the button aperture 146 of the grip base 140. The lateral portions of the upper section 176 are positioned within the central guide 148 of the grip base 140 and pass through apertures formed in the end extensions 144 of the grip base 140 such that the lower sections 178 extend downward within the interior of the arm members 26, 28. The crimps 180 are applied to at least one of the terminal ends of the cable 32 after passing through the grip base 140. Before the grip cover 150 is mounted to the grip base 140, one or more compression springs are positioned to cooperate with the button 30. The grip cover 150 may then be mounted to the grip base 140, which involves placing the grip cover 150 over the central channel 142 and inserting screws through the screw housings 152 of the grip cover 150 and the screw housings 153 of the grip base 140. The grip cover 150 forms an abutment for the compression spring(s) that cooperate with the button 30. To release the handle assembly 12 from the handle guides 14, 16, a user may simply use one or more fingers to depress the button extension 172 within the button aperture 146 of the grip base 140. This will cause the internally disposed compression springs to compress, which in turn will draw the lower sections 178 of the cable 32 upward within the arm members 26, 28. This forces the wedges 27 into abutment with the ramped section 154 of the spring clip 33, which removes the locking pin 34 of the spring clip 33 from the locking aperture 130 of the handle guides 14, 16 to release the handle assembly 12 from the handle guides 14, 16.

Figures 43A, 43B, 43C:
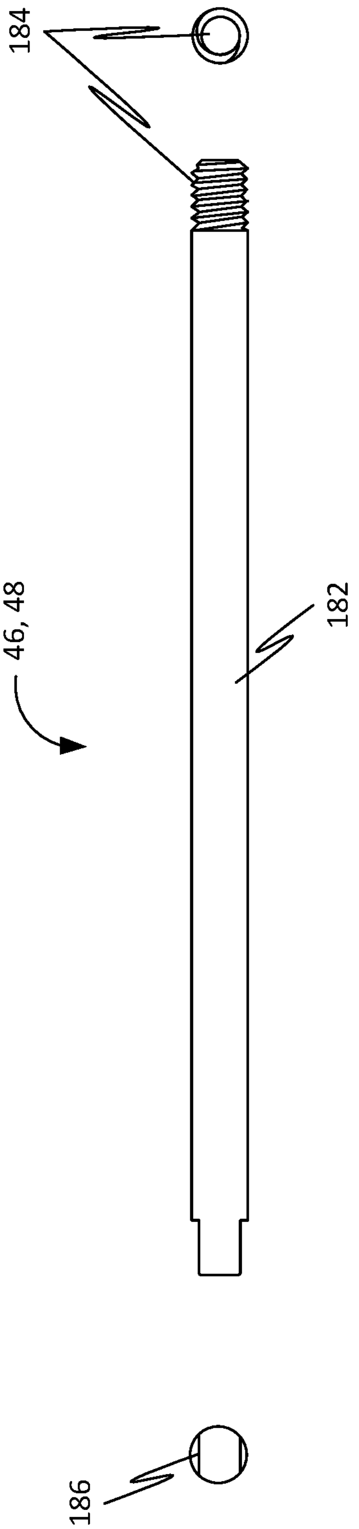
FIGS. 43A-43C are various views of a shaft forming part of the actuator assembly of FIGS. 1-7 according to aspects of the present invention.
Figure 44C:
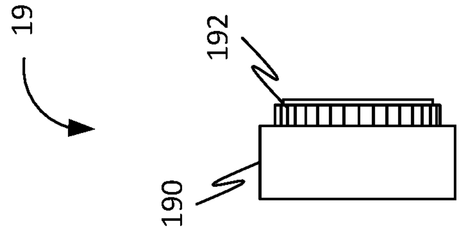
FIGS. 44A-44C are various views of a shaft guide forming part of the actuator assembly of FIGS. 1-7 according to aspects of the present invention.
Figure 44B:
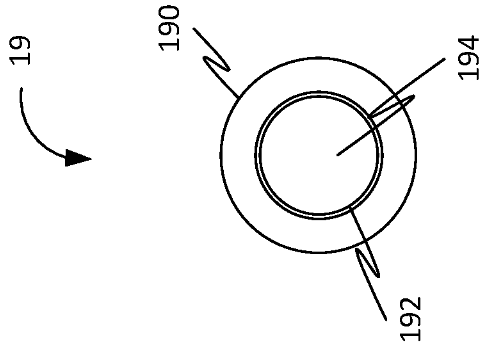
Figure 44A:
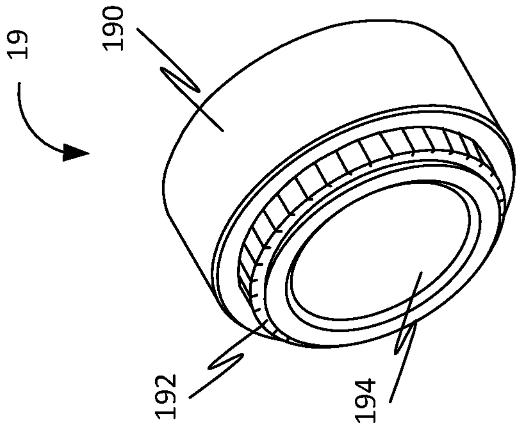

FIGS. 43A-43C are various views of the shafts or rails 46, 48 forming part of the actuator assembly 10 of FIGS. 1-7 according to aspects of the present invention. The rails 46, 48 each include a smooth central section 182 extending between a threaded end 184 and a keyed end 186 having flat upper and lower surfaces. The rails 46, 48 extend between the upper mounting plate 54 (tabs 74) and the lower mounting plates 18, 20, respectively. The smooth central section 182 is dimensioned to interact with the rollers 56, 58 of the floating tail piece assembly 50, as well as the rail bores 110 of the truss lock 52, to allow both structures to translate or otherwise move up and down within the actuator assembly 10. Movement of the truss lock 52 along the rails 46, 48 occurs due to the rotation of the handle assembly 12 when engaged with the handle guides 14, 16. Movement of the floating tail piece assembly 50 along the rail 46, 48 occurs due to the movement of the truss lock 52 (when the handle assembly 12 is engaged with the handle guides 14, 16) and due to the forces exerted upon the translating tail piece assembly 50 by the strings of the instrument and the springs 60, 62. The threaded end 184 of the rails 46, 48 are fixedly coupled to the upper mounting plate 54 by passing each through the apertures 80 and threading on a lock-nut or the like. The keyed end 186 is loosely retained by the lower mounting plates 18, 20 by passing each through the apertures 88 and into the shaft guide FIG. 44A-44C are various views of the shaft guides 19 forming part of the actuator assembly 10 of FIGS. 1-7 according to aspects of the present invention. The shaft guide 19 includes a base 190, an extension 192, and a shaft bore 194 extending therethrough. The extension 192 is press fit into the apertures 88 of the lower mounting plates 18, 20 such that the base 190 extends away from the main part of the actuator assembly 10. The shaft bore 194 is dimensioned to retain the keyed end 186 of the rails 46, 48, yet in a semi-constrained manner (vs. rigidly). Providing this semi-constrained engagement between the lower end of the rails 46, 48 will facilitate the translation of the floating tail piece assembly 50 and the truss lock 52 and prevent or minimize the likelihood of any jamming or misalignment.

Figure 52:
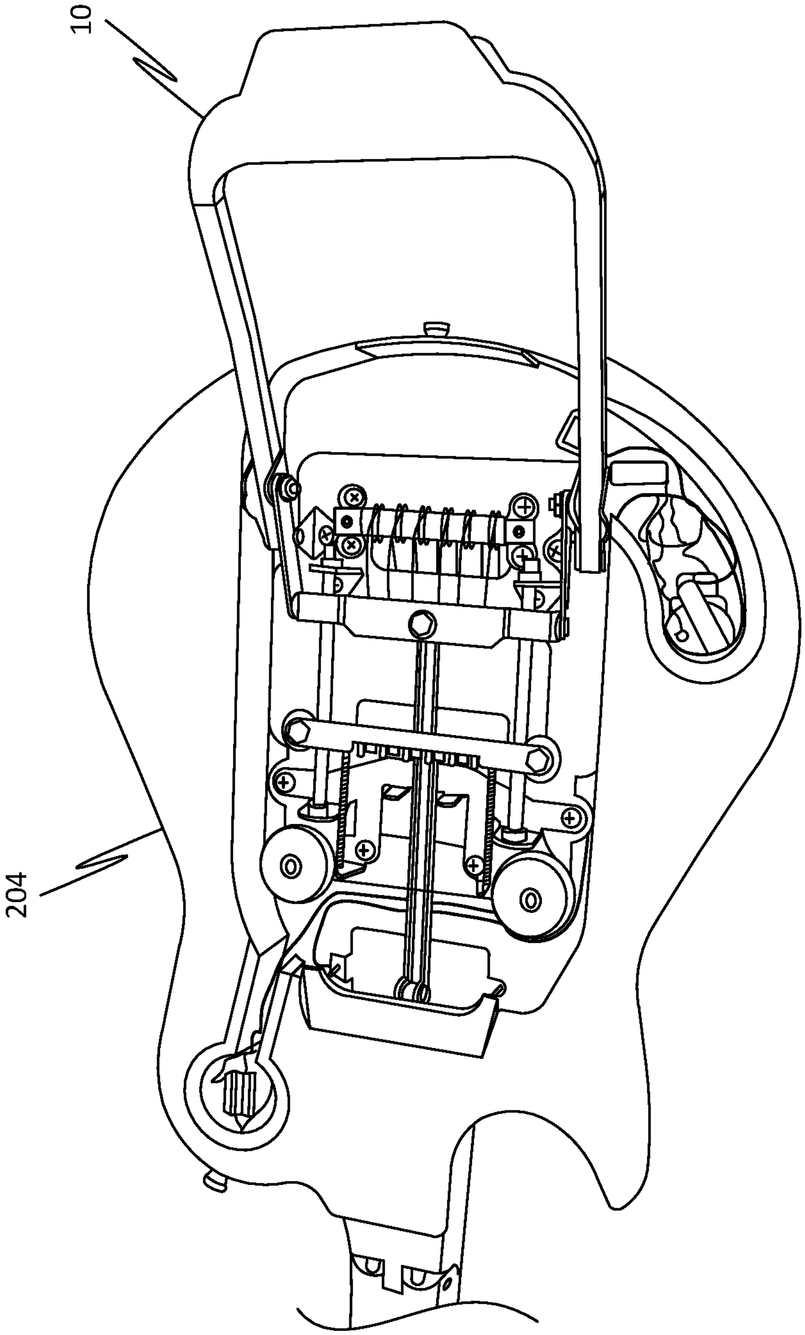
FIGS. 52-54 are enlarged views of the body of the foldable stringed instrument of FIGS. 45-46 showing the neck in the folding process to return to the playing, fully extended state in FIG. 49.
Figure 53:
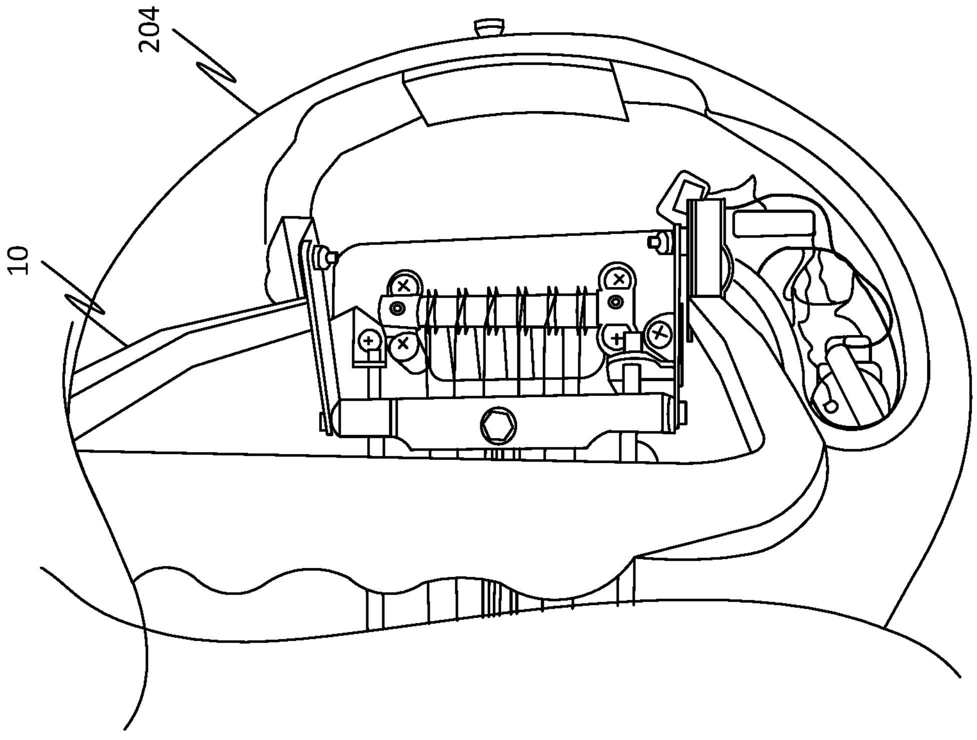
Figure 54:
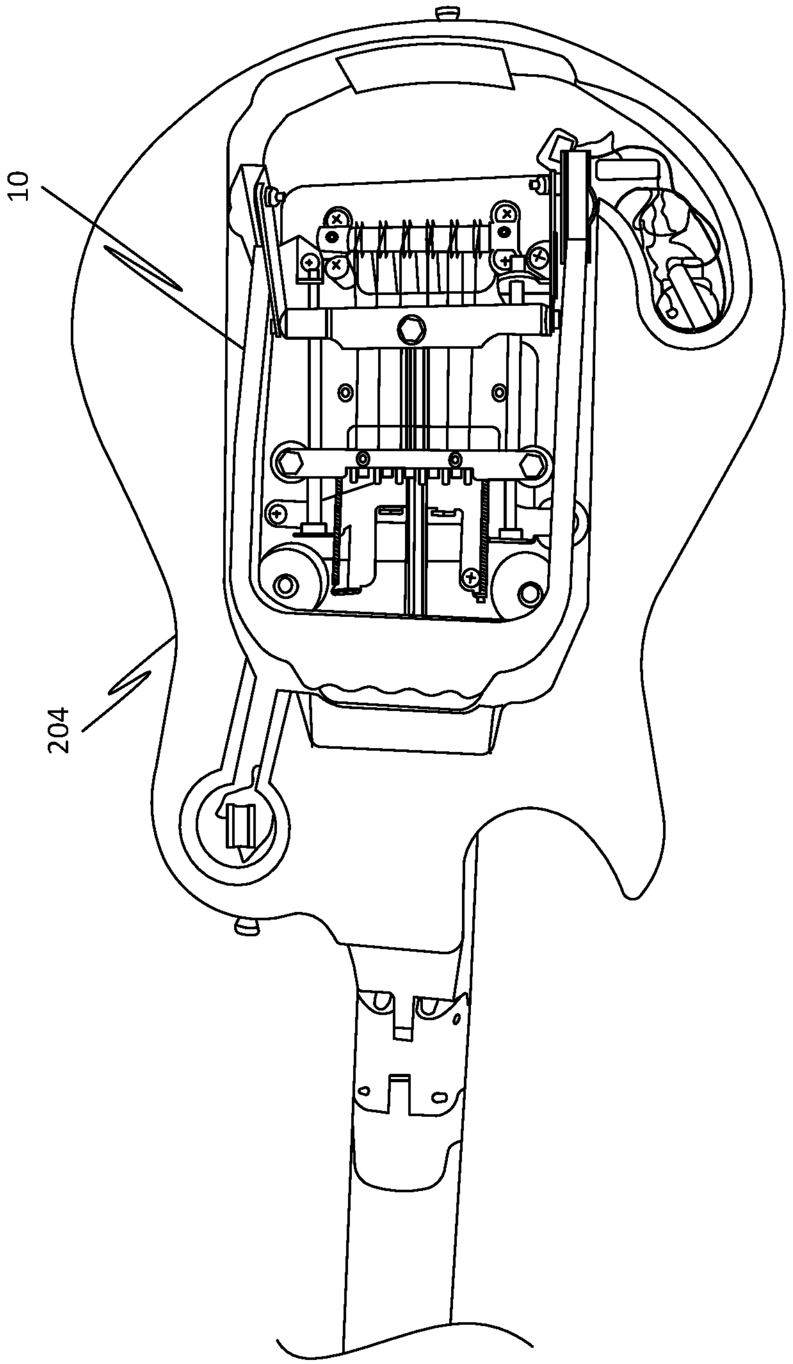

FIGS. 45-54 illustrate the foldable stringed instrument 200 in the folding and unfolding process according to aspects of the present invention. FIGS. 47-51 show the folding process, whereby the actuator 10 is disengaged to allow the neck 202 to be positioned within the back recess 206 of the body 204. FIGS. 52-54 show the unfolding process, whereby the actuator 10 is reengaged after the neck has been fully extended such that the strings can be return to the fully tensioned, playable state.

Any of the features or attributes of the above the above described embodiments and variations can be used in combination with any of the other features and attributes of the above described embodiments and variations as desired. From the foregoing disclosure and detailed description of certain preferred embodiments, it is also apparent that various modifications, additions and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A foldable stringed instrument, comprising:

a body having a longitudinal axis, an upper surface, a lower surface, and a back recess formed in the lower surface and extending from the lower surface towards the upper surface;

a neck mounted to the body, said neck having a longitudinal axis generally parallel to said longitudinal axis of said body, said neck including a hinge configured to be selectively folded such that said neck is positioned over or within said back recess of said body; and an actuator mounted to said body, said actuator including a string anchor that can move between a first position and a second position separated from the first position, and a handle rotatably operable along a plane generally parallel to said longitudinal axes of said neck and said body to selectively lock said string anchor in the first position to thereby tighten strings coupled to the string anchor and to selectively unlock said string anchor to loosen the strings and enable said string anchor to move to the second position while the strings extend over the hinge when the hinge is selectively folded.

2. The foldable stringed instrument of claim 1, wherein the actuator includes a chassis structure comprising a first plate member configured to be adhered within the back recess of said body and a plurality of secondary plate members extending generally perpendicularly from said first plate member.

3. The foldable stringed instrument of claim 2, wherein said actuator includes a string roller mounted to said chassis structure.

4. The foldable stringed instrument of claim 3, wherein said string roller is configured to pass the strings from said string anchor through an aperture extending from said back recess to said upper surface.

5. The foldable stringed instrument of claim 1, wherein said actuator includes a truss lock coupled to said handle.

6. The foldable stringed instrument of claim 5, wherein said truss lock is configured to force said string anchor into said first position during rotational operation of the handle in a first direction to thereby tighten the strings coupled to said string anchor.

7. The foldable stringed instrument of claim 5, wherein said truss lock is configured to release said string anchor from said first position during rotational operation of the handle in a second direction to thereby loosen the strings coupled to said string anchor.

8. The foldable stringed instrument of claim 1, wherein said actuator includes at least one spring coupled to said string anchor to allow said string anchor to move from said first position to said second position when said hinge of said neck is folded.

9. The foldable stringed instrument of claim 1, wherein said handle of said actuator is generally U-shaped and rotatable between a first position and a second position greater than ninety (90) degrees From said first position.

10. An actuator for a stringed musical instrument, comprising:

a chassis configured to be mounted within a recess of a body of a stringed musical instrument, said chassis having a first axis extending between a first end and a second end, said chassis comprising a first plate member configured to be adhered within the back recess of said body and a plurality of secondary plate members extending generally perpendicularly from said first plate member;

a string anchor linearly moveable relative to said chassis between a first position and a second position located a distance from said first position along said first axis of the chassis; and a handle rotationally moveable relative to said chassis to selectively lock said string anchor in the first position to thereby tighten strings coupled to the string anchor and to selectively unlock said string anchor from said first position to thereby loosen the strings coupled to the string anchor.

11. The actuator for a stringed musical instrument of claim 10, including a string roller mounted to said chassis.

12. The actuator for a stringed musical instrument of claim 11, wherein said string roller is configured to pass the strings extending from said string anchor.

13. The actuator for a stringed musical instrument of claim 10, including a truss lock coupled to said handle.

14. The actuator for a stringed musical instrument of claim 13, wherein said truss lock is configured to force said string anchor into said first position during rotational operation of the handle in a first direction to thereby tighten the strings coupled to said string anchor.

15. The actuator for a stringed musical instrument of claim 13, wherein said truss lock is configured to release said string anchor from said first position during rotational operation of the handle in a second direction to thereby loosen the strings coupled to said string anchor.

16. The actuator for a stringed musical instrument of claim 10, including at least one spring coupled to said string anchor to allow said string anchor to move from said first position to said second position.

17. The actuator for a stringed musical instrument of claim 10, wherein said handle of said actuator is generally U-shaped and rotatable between a first position and a second position greater than ninety (90) degrees From said first position.

18. The actuator for a stringed musical instrument of claim 10, including a ram rod configured to move from a first position to a second position when said handle is rotationally operated in a first direction and a second direction, respectively.

19. The actuator for a stringed musical instrument of claim 18, wherein said ram rod has an end configured to be coupled to a locking element of a multi-link hinge.

* * * * *